(12) United States Patent
Johansson et al.

(10) Patent No.: US 8,423,467 B1
(45) Date of Patent: Apr. 16, 2013

(54) MERCHANT-SPECIFIC SHADOW ACCOUNT NUMBERS

(76) Inventors: Jesper M. Johansson, Woodinville, WA (US); David H. Hijirida, Seattle, WA (US); Peter S. Vosshall, Bainbridge Island, WA (US); Rajiv Chopra, Bellevue, WA (US); Terrance Douglas Hanold, Seattle, WA (US)

( * ) Notice: Subject to any disclaimer, the term of this patent is extended or adjusted under 35 U.S.C. 154(b) by 236 days.

(21) Appl. No.: 12/719,324

(22) Filed: Mar. 8, 2010

(51) Int. Cl.
*G06Q 40/00* (2012.01)
(52) U.S. Cl.
USPC .......................................................... 705/44
(58) Field of Classification Search .................. 705/44
See application file for complete search history.

(56) References Cited

U.S. PATENT DOCUMENTS

| 7,954,704 | B1 * | 6/2011 | Gephart et al. | 235/380 |
| 2002/0147678 | A1 * | 10/2002 | Drunsic | 705/39 |
| 2003/0080186 | A1 * | 5/2003 | McDonald et al. | 235/380 |

OTHER PUBLICATIONS

Kianieff, Muharem M.; Consumer retail online payments: York University (Canada). 2008. NR40433.*
Merryweather, Judith.; Business software review: Shopping for software; Charter 64. 3 (Apr. 1993): 24.*
Koon, Chong Pooi. HSBC Bank's new product for young, IT-savvy customers: [Main/Lifestyle], New Straits Times [Kuala Limpur] Jan. 19, 2007: 46.*

* cited by examiner

*Primary Examiner* — Hani M Kazimi
*Assistant Examiner* — Hatem M Ali
(74) *Attorney, Agent, or Firm* — Lee & Hayes, PLLC

(57) ABSTRACT

Financial transactions, such as buying and selling, may be facilitated by merchant-based shadow account numbers. A master account may contain several associated shadow accounts. Each shadow account may in turn be associated with a specific merchant or group of merchants. Merchants and users may store and use the shadow account numbers rather than the master account numbers. Stolen or otherwise compromised shadow account numbers are useless with other non-associated merchants. Furthermore, the shadow numbers may be easily invalidated while leaving the master account untouched.

30 Claims, 18 Drawing Sheets https://www.paymentprocessingservice.com

Activity for Period 9/1/2009 to 9/30/2009

1202 → MASTER ACCOUNT 124

SHADOW ACCOUNT NO. 110(1) DESIGNATED TO MERCHANT 108(1)
"KAELAN'S BOOKS AND MUSIC"
BALANCE FROM LAST STATEMENT: $215.38

| | | |
|---|---|---|
| 9/15/2009 | BOOK – "HISTORY OF THE FORK" | $19.95 |
| 9/18/2009 | MUSIC – "MUSIC OF THE SPHERES" | $14.95 |
| 9/30/2009 | FINANCE CHARGES (9% INTEREST) | $19.39 |

1204 → ( Select payment )   TOTAL FOR THIS SHADOW ACCOUNT   $54.29

SHADOW ACCOUNT NO. 110(2) DESIGNATED TO MERCHANT 108(2)
"THE SWEAT SHOP EXERCISE EMPORIUM"
BALANCE FROM LAST STATEMENT: $0

| | | |
|---|---|---|
| 9/11/2009 | CLOTHING – EXERCISE TANK TOP | $29.95 |
| 9/18/2009 | EQUIPMENT – TRICEP TONER | $44.95 |
| 9/30/2009 | REWARDS ACCOUNT SERVICE FEE | $ 5.00 |
| 9/30/2009 | REWARDS POINTS ACCRUED TO DATE 11,231 | |

NOTE – THIS ACCOUNT MUST BE PAID IN FULL EACH MONTH.

( Select payment )   TOTAL FOR THIS SHADOW ACCOUNT   $124.02

SHADOW ACCOUNT NO. 110(3) DESIGNATED TO MERCHANT 108(3)
"THE GENERAL'S STORE"
BALANCE FROM LAST STATEMENT: $1,110.29

| | | |
|---|---|---|
| 9/6/2009 | EQUIPMENT – SNOWBLOWER | $599.97 |
| 9/29/2009 | CLOTHING – EAR MUFFS | $ 21.95 |
| 9/7/2009 | FOOD – BEEF JERKY 24OZ | $ 17.95 |
| 9/30/2009 | FINANCE CHARGES (0% INTEREST PROMO) | $ 0.00 |

NOTE – MINIMUM PAYMENT ON THIS ACCOUNT IS $50.00

( Select payment )   TOTAL FOR THIS SHADOW ACCOUNT   $651.70

( Select payment )   TOTAL DUE   $828.01

FIG. 12

MERCHANT-SPECIFIC SHADOW ACCOUNT NUMBERS

BACKGROUND

Commerce depends on a vast number of financial transactions that distribute funds amongst participants such as merchants, customers, companies, and other entities. Traditional methods of conducting financial transactions consist of an exchange of currency, which may include paper currency, checks, credit cards, and electronic transfers. With each type of currency, a number of processes are typically necessary to fulfill a transaction. The processes may include a payment fulfillment process, paperwork, and processes performed by a financial institution such as a bank, credit union or third-party processor in communication with financial institutions.

In addition, some financial transactions have moved online. For instance, it is commonplace for entities to transfer payments across the Internet to complete a transaction. In addition to the Internet, other electronic forms of communication enable payment transmission, such as mobile telephony including wired and wireless communications.

To facilitate these financial transactions, payment information such as account numbers may be stored. However, once stored, this payment information may be compromised by theft, poor security policies, and so forth. Or, the customer may be subjected to a "phishing" attack and may be enticed to disclose sensitive information, such as payment information, to a malicious entity.

Currently, attempts to safeguard payment information involve increasing the barriers to accessing this payment information. For example, merchants and banks may deploy more robust firewalls, encryption, physical security, security policies, and so forth. However, these current techniques do not reliably safeguard payment information after compromise of these barriers nor do they protect the information from phishing attacks or other attacks where the customer divulges the information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 12 is an illustrative rendering of a user interface depicting information about shadow account activity.

DETAILED DESCRIPTION

Overview

Figure 1:
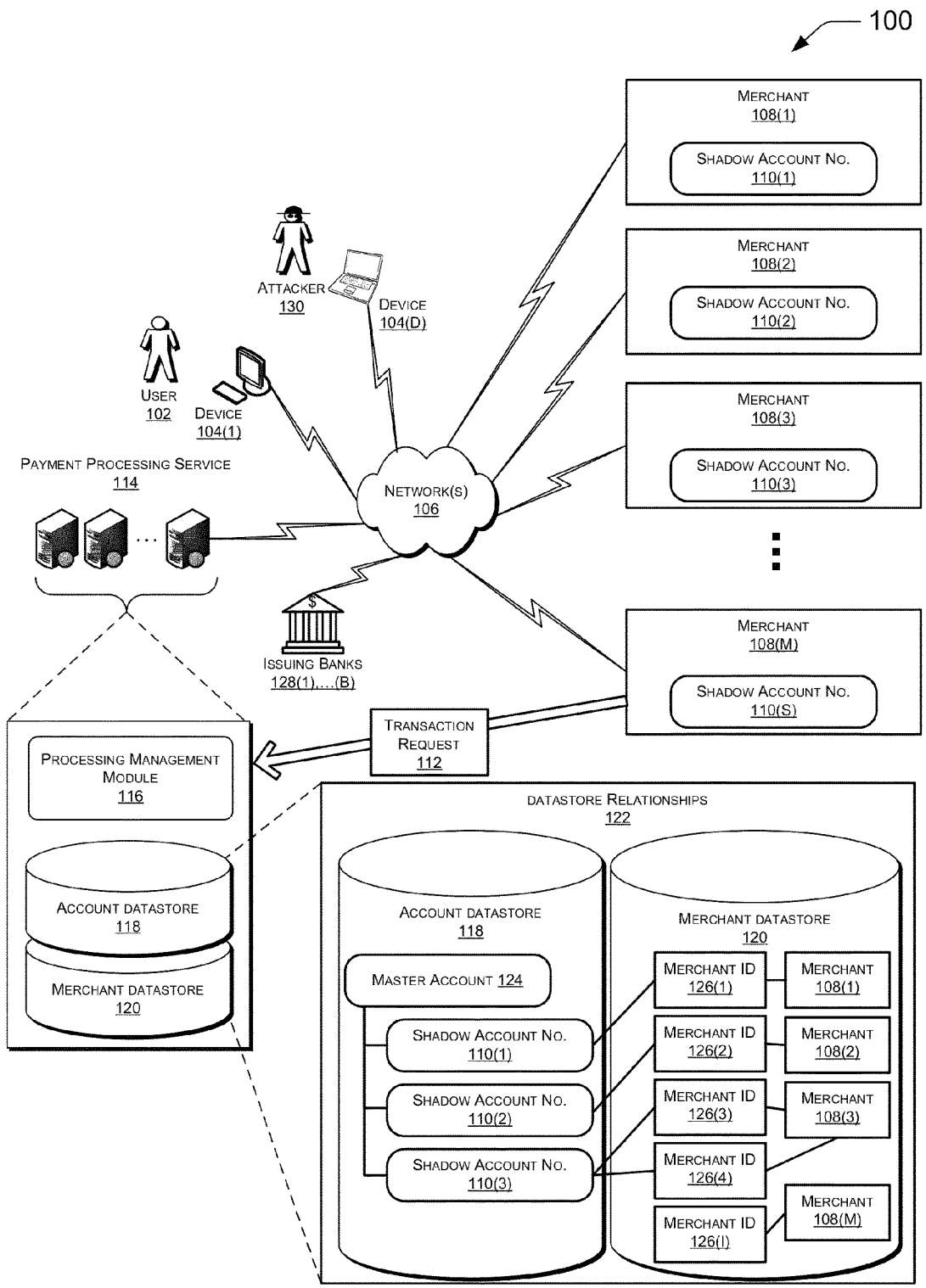
FIG. 1 is an illustrative architecture for implementing shadow account numbers.

This disclosure is directed to techniques and systems for providing shadow account numbers to minimize or eliminate a risk of fraud that is inherent in traditional payment processing techniques. For instance, shadow account numbers may be used by merchants, customers, payment processors, or other participants in a financial transaction to minimize loss in the event of a compromise of payment information. Shadow account numbers conceal an underlying actual account number, but may also be merchant-specific. Thus, the combination of a specified merchant and specified shadow account number is necessary for a transaction to be valid. By requiring this combination, shadow account numbers improve security and reduce or eliminate the risk of fraud.

Shadow account numbers are tied to a master account number. This relationship allows for the use of the shadow account numbers to retain the secrecy of both master and subordinate accounts, while also providing users with unique ways to interact with their accounts. For example, the association of subordinate accounts with the master account number provides for a common administrative point. Thus, shadow account numbers also provide flexibility to customers by allowing easy access and administration of different financial instruments.

A master account is associated with a particular account holder. This master account may be maintained by a financial institution, payment processing service, and so forth. The master account may be a financial master account such as a financial account from an issuing bank, a root account from which other issuing bank accounts are associated, or a combination of the two.

An issuing bank account, meanwhile, is an account or other financial instrument that is maintained by a financial institution. For example, a credit card account "1234" from ABC Bank is one example of an issuing bank account. Issuing bank accounts may inherit characteristics from the master account. Thus, in some instances issuing bank accounts that are subordinate to the master account may be severed from the master account and remain functional.

An issuing bank account may be severed from the master account, in which case it may be attached to a new master account. For example, a parent may have an issuing bank account associated with the parent's master account and may also authorize a child to use the account. Eventually, the child may grow, and the parent may transfer the issuing bank account solely to the child and release the connection to the parent's master account. The issuing bank account would still remain functional, but would no longer be associated with the master account.

In comparison, a sub-account is an account that depends on an issuing bank account or other financial instrument maintained by a financial institution. For example, credit card account "1234" may have several sub-accounts, 1234(1), 1234(2), ..., 1234(Z). These subaccounts may have different terms, but may inherit characteristics from their parent financial instrument. Thus, a sub-account may typically not be severed from its parent and still remain a functional financial instrument unless it is re-attached to a different parent account.

A master account may have one or more sub-accounts, issuing bank accounts, and so forth. Each sub-account, issuing bank account, or other financial instrument that is subordinate to the master account may receive a shadow account number, as described herein. Each shadow account number is associated with at least one specific attribute. Specific attributes include merchant identifiers, geographic identifiers (e.g., city, county, state, country, and so forth), merchant types, transaction amounts, and so forth.

For a transaction involving a shadow account number to be valid, the combination of shadow account number and the specific attribute as presented should be equivalent to that which is stored. For example, a payment processing service may store an indication that a shadow account number "78910" representing credit card account 1234(1) is associated with merchant "Bob's Taco Shop." The payment processing service thus knows that transactions made with account number 78910 are valid only when the identified merchant submitting the request for payment is "Bob's Taco Shop." Thus, a transaction involving account number 78910 and coming from "Edna's Books" would be invalid in this example.

Shadow account numbers may be formatted, stored, presented, and transacted as if they were universally valid. Thus, a shadow account number may contain information and a format such that it is indistinguishable upon inspection from another financial instrument, including the master account number. For example, where the master financial instrument associated with the shadow account number is a checking account, the shadow account number may appear to be a valid checking account number. Alternatively, in instances where the financial instrument associated with the shadow account number is a credit card, the shadow account number may appear to be a valid credit card number. It is also possible that the shadow account instrument type and the master account instrument type are different. For example, if the master account is a checking account a shadow account number tied to it may be a credit card instrument that is usable only at "Billy's Gas Station," or only usable at gas stations in general.

A shadow account number thus includes sufficient payment information to complete a transaction. For example, a shadow account number for a credit card account may include an account number, a card verification number, an expiration date and so forth, just as a traditional credit card account would include. The shadow account number is thus indistinguishable from any other credit card account, or account of that type.

Shadow account numbers conceal underlying payment information, and may be formatted and processed as if they were actual account numbers. This similarity in appearance introduces a significant barrier to an attacker. For example, upon obtaining a list of account numbers, the attacker cannot distinguish which of those accounts numbers are shadow accounts or actual accounts.

This inability to distinguish actual account information from shadow account information poses a problem to an attacker. The attacker would need to attempt a transaction, or at least an authorization, to determine whether the number is a merchant-specific shadow account number, or an actual account number that is usable universally. In instances where the attempted transaction or authorization fails (e.g., because the attacker attempts to use a merchant-specific shadow account number at the wrong merchant), the attempted transaction would result in triggering a fraud alert. Furthermore, this fraud alert may result in disabling the compromised payment information, rendering it useless.

Furthermore, in the event of a suspected compromise of payment information, or simply as part of normal security procedures, the shadow account numbers may be retired and replaced with new shadow account numbers. Such replacement may be made without users even being aware of such a change, as financial transactions still flow to their associated account.

Use of shadow accounts also provides additional benefits to users. By tying subordinate accounts to the master account, users benefit from the increased security as well as easy administration and payment. For example, a user may be presented with details relating to the shadow account transactions in a single user interface. The user may pay to a single account, such as the master account, and may distribute funds amongst the subordinate accounts, such as sub-accounts and issuing bank accounts which depend from the master account.

Also, while discussed in the context of online transactions, it is understood that the techniques described in this application may be applied to transactions in a conventional setting. For example, shadow account numbers may be embodied on a plastic card, printed on a check, and so forth for use at a physical storefront.

Illustrative System Architecture

FIG. 1 is an illustrative system architecture 100 for implementing shadow account numbers to minimize or eliminate a risk of fraud that is inherent in traditional payment processing techniques. Within architecture 100, a user 102 may use a device 104, such as a desktop computer, laptop, network, eBook reader device, and so forth, to access a network 106 in order to communicate with one or more merchants 108(1), 108(2), ... 108(M). Network 106 may include any one or combination of multiple different types of networks, such as cable networks, the Internet, and wireless networks.

Merchants 108(1)-(M) may be of any size ranging from a sole proprietor to international retailers. These merchants may provide goods or services, either to individual users or other consuming entities. In addition, each merchant 108 may store one or more shadow account numbers 110(1), 110(2), ..., 110(S) in place of actual account numbers. A merchant 108 may send a transaction request 112 comprising a shadow account number to payment processing service ("PPS") 114 to initiate a transaction, such as the transferring of funds to pay for a purchase at the merchant 108. In some implementations, transaction request 112 may be transmitted via network 106 or by another network. By sending shadow account numbers rather actual account numbers, the users associated with these accounts are much less likely to lose payment information that will be usable by attackers or other malicious entities.

PPS 114 is hosted on one or more servers having one or more processors and memory. In one implementation, the servers might be arranged in a cluster or as a server farm, although other server architectures may also be used. The PPS 114 is capable of handling transaction requests 112 with a processing management module 116. In the illustration, processing management module 116 validates an example transaction request 112, as well as other transaction requests received from other merchants. Validation may include accessing information stored in account datastore 118 and merchant datastore 120, which are accessible to the processing management module 116. A datastore is configured to permit storage and retrieval of data on one or more computer-readable storage media. For example, a file, a relational database, an object oriented database, and so forth are types of datastores which may be stored on a magnetic, optical, or electronic media.

FIG. 1 also depicts that one or more relationships 122 may exist within and between account datastore 118 and merchant datastore 120. For instance, a master account 124 associated with a particular user or other entity may have one or more subordinate shadow account numbers 110(1), 110(2), 110(3), . . . , 110(S). Each shadow account number 110 may be associated with a particular specific attribute, such as a merchant identifier 126(1), 126(2), 126(3), . . . , 126(Q) stored in merchant datastore 120. For example, shadow account number 110(1) may be associated with merchant ID 126(1), which in turn is associated with merchant 108(1).

Furthermore, each merchant 108 may be associated with one or more merchant identifiers 126(1), . . . , 126(Z). For example, merchant 108(3) may be associated with merchant ID 126(3) and merchant ID 126(4). The capability for merchants 108 to have multiple merchant ID's 126 provides flexibility to merchants. For example, merchants may wish to distinguish between subsidiary stores, multiple storefronts, or e-commerce sites operating under different brand names, or product types offered. Additionally or alternatively, merchants may wish to improve security by varying the merchant ID they use, as described below with regards to FIG. 3.

Within architecture 100, the user 102 may purchase an item from merchant 108(1) using a shadow account number 110(1). Merchant 108(1) may send the transaction request 112 comprising the shadow account number 110(1) and a merchant ID 126(1) to PPS 114. PPS 114 may validate the shadow account number 110(1) and the merchant ID 126(1) in the transaction request 112 against the shadow account number's stored in the account datastore 118 and the merchant datastore 120. When the combination of shadow account number 110(1) and merchant ID 126(1) is valid, the transaction request 112 may be approved.

Upon approving the transaction request 112, funds may be transferred between issuing banks 128(1), 128(2), . . . , 128(B).). In some implementations, PPS 114 may also be a financial institution such as an issuing bank 128. The PPS 114, issuing bank 128, or both may charge fees associated with this service.

In some instances, an attacker 130 may attempt to compromise the users 102, the merchants 108, the PPS 114, the banks 128, and so forth. For instance, the attacker 130 may attempt to compromise payment information by penetrating systems operated by users, merchants, or some intermediary; or deceiving users 102, merchants 108(1)-(M), the payment processing service 114, or issuing banks 128(1)-(B). However, even upon obtaining payment information, the attacker 130 may not know at what the merchants 108(1)-(M) the payment information will be valid, as described next.

Figure 2:
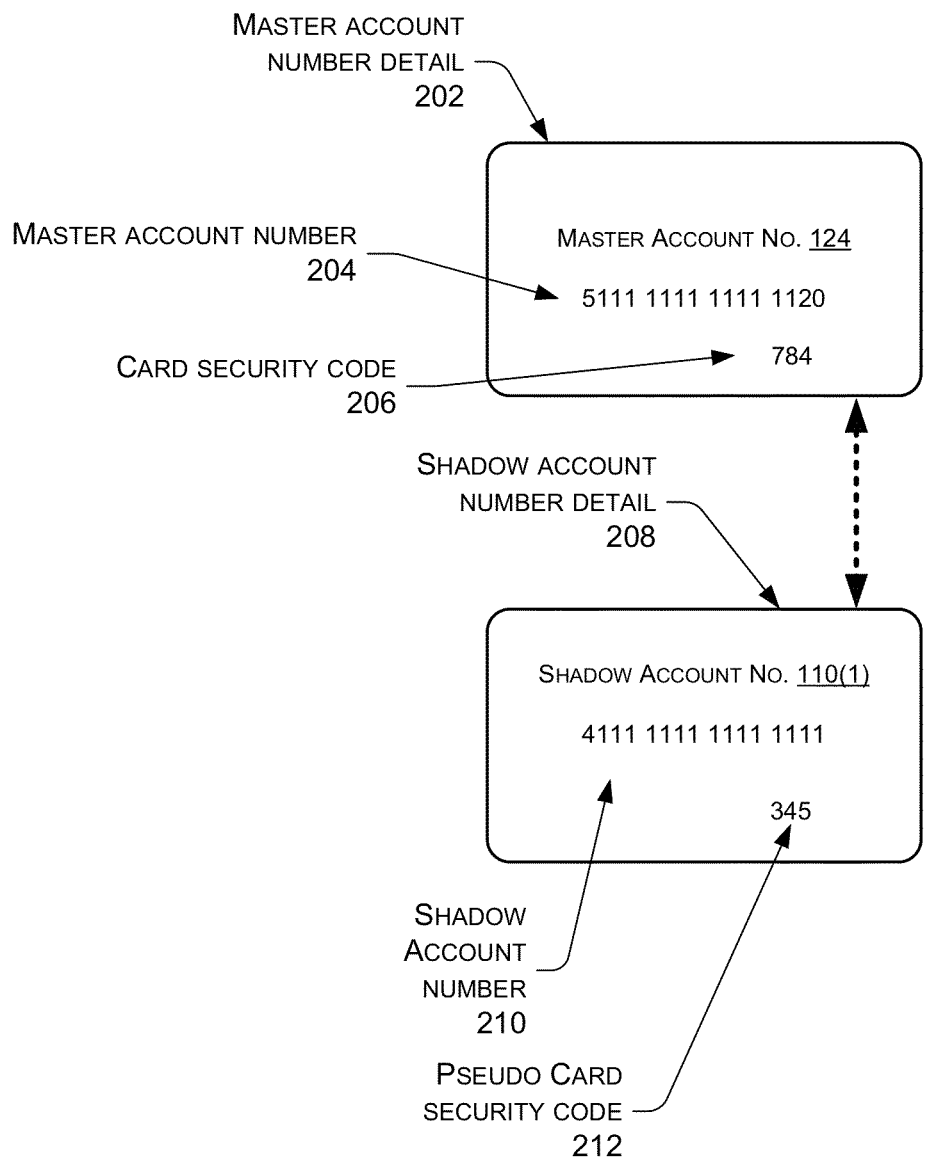
FIG. 2 is an illustrative diagram of master and shadow accounts.

FIG. 2 is an illustrative diagram 200 of master and shadow accounts and their associated account numbers. Account numbers may include numeric account designators, alphanumeric account designators, alphabetic account designators, or other information which may be used to identify a particular account. By way of illustration, this example assumes the master and shadow accounts are credit card numbers. However, other implementations may employ other accounts, such as debit card numbers, gift card numbers, checking account numbers, or the like.

A master account number detail 202 is shown for master account 124 of FIG. 1. An account number 204 is shown depicting a 16 digit number "5111 1111 1111 1120," which is typical of a credit card number. This 16 digit number is compliant with the Luhn (or mod10) check, which is used as a rough initial validation of whether a number may be credit card number. A card security code 206 is also shown, with a value of "784." Thus, this example illustrates that master account 124 is a valid credit card account with payment information sufficient to permit transactions where a card is not present, such during an online purchase. For ease of illustration, other information such as a name on the card, billing address, expiration date, and so forth are omitted.

At 208, a shadow account number detail is shown for shadow account number 110(1). A shadow account number 210 of "4111 1111 1111 1111" is shown with a pseudo card security code 212 of "345." Shadow account number 210 has the same number of digits as the master account number, and passes the same verification checks used to distinguish a sequence of digits as a potentially valid account number.

Because both the master account and the shadow account meet the formatting and basic data validation checks for an account number, an attacker (e.g., attacker 130 from FIG. 1) may be unable to distinguish the shadow account number 210 from the master account number 204. However, while the master account number 204 may be universally used at any merchant 108(1)-(M), shadow account number 210 may only be used in accordance with restrictions placed upon them, such as the designated merchant 108(1). As such, a user associated with these accounts is at much less of a security risk in the event that attacker 130 obtains details 208 of the shadow account, as contrasted with the attacker obtaining details 202 of the master account.

In addition, because the shadow account may include each piece of information found in a corresponding master account, users and merchants may conduct transactions with the shadow accounts using existing transactional infrastructure. Furthermore, the shadow account numbers provide a way to determine a source when payment information has been compromised. For example, suppose that one or more shadow account numbers are issued to a specific merchant 108(1), but not to the user 102 (such as described later with regards to FIG. 17). An attempted transaction request 112 received from a different merchant indicates a loss of data either where the master account-shadow account relationship is stored, such as at PPS 114, or at the specific merchant 108(1).

While the master and shadow accounts are shown as credit card numbers in FIG. 2, it is understood that other types of payment information may used. For example, an alphanumeric phrase, a checking account number, and so forth may be used to identify master and shadow accounts.

Furthermore, it is understood that the shadow account number may not be directly indicative of the underlying sub-account, issuing bank account, and so forth. For example, a shadow account number may be 14 digits (such as might be indicative of a Diners Club International® credit card) and yet refer to an underlying credit card account which has 16 digits (such as a MasterCard® credit card). In another example, a shadow account number may appear to be a routing transit number associated with a checking account, but actually refer to a credit card account, or vice versa.

Once the shadow account number has been associated with an account and one or more specific attributes, such as a merchant ID, the shadow account may be made available for use in transactions. One such use occurs when a user has indicated that they wish to engage in a financial transaction, such as paying for a purchase. When this occurs, a merchant may send a transaction request 112 to PPS 114. This transaction request 112 is describe in more detail next.

Figure 3:
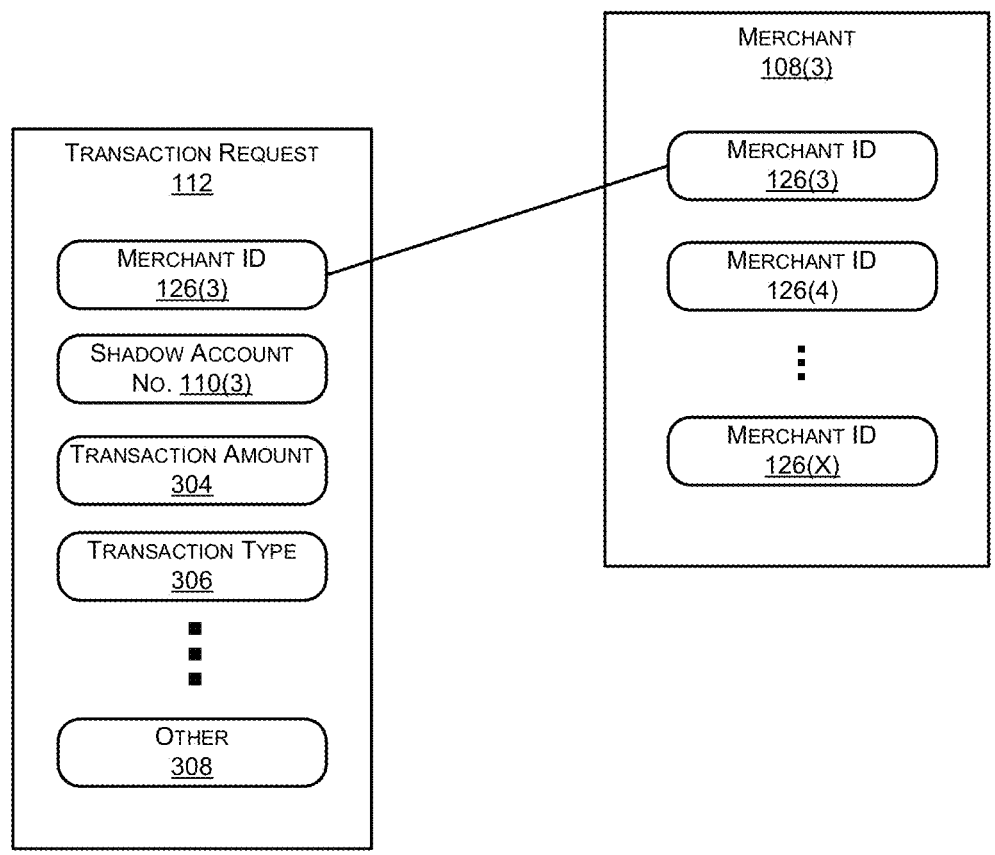
FIG. 3 is an illustrative diagram of a transaction request that leverages a shadow account number.

FIG. 3 is an illustrative diagram 300 of example transaction request 112 of FIG. 1. Each transaction request 112 may include one or more specific attributes, such as a merchant ID 126. Each merchant ID 126 is associated with a specific merchant 108. Also, each merchant 108 may have several merchant IDs 126(1)-(Z), as discussed above with reference to FIG. 1. For instance, the current example illustrates that merchant 108(3) is associated with at least merchant ID's 126(3) and (4).

A merchant may have several merchant IDs 126 for several reasons. For example, a merchant may have several subsidiary stores, such as storefronts or e-commerce sites operating under different brand names, and may wish to distinguish between these. Or, a merchant may wish to use different identifiers for some other purpose such as to restrict account numbers to purchasing particular products. Additionally or alternatively, a merchant may be assigned several merchant identifiers 126 to enhance security. For example, a plurality of merchant IDs 126 may increase the difficulty presented to an attacker 130 attempting to decrypt transaction requests 112 by looking for an identical merchant identifier across all of the transaction requests 112. When merchant IDs vary, decryption attacks may be more difficult relative to decrypting transaction requests, where each transaction request contains an identical merchant ID string.

In some implementations, transaction request 112 may omit the specific attribute, such as the merchant ID 126. In such implementations, the specific attribute may be determined in another fashion, such as from a network address of the source that sends the request, an encryption format used, a communication link upon which the transaction request 112 was received, and so forth. For example, a transaction request 112 may omit the merchant ID 126, while PPS 114 may infer the merchant ID based on receipt of the transaction request 112 via a specific network communication interface.

Transaction request 112 also comprises a shadow account number 110, such as shadow account number 110(3) that is associated with merchant 108(3) in the instant example as described above. PPS 114 may use the combination of a specific attribute, such as merchant ID 126, and the shadow account number 110 to validate the transaction request 112.

Transaction request 112 may also comprise a transaction amount 302. This transaction amount may indicate the value of the transaction and may also indicate the currency type. For example, the transaction amount 302 may be $54.29 in United States dollars. Transaction type 304 may also be present in transaction request 112 and may designate whether the transaction request is for a sale, refund, payment, and so forth. Other data 306 may also be included in the transaction request 112 as called for. For example, other data 306 may include a quantity of items purchased, weight of items purchased, shipping address, and so forth.

Illustrative Shadow Account Structure

Shadow accounts may be related to underlying "real" accounts, such as subaccounts of an issuing bank account, separate issuing bank accounts, and so forth, in several ways. FIGS. 4-9 discuss some of the hierarchies that these contexts may implement.

Figure 4:
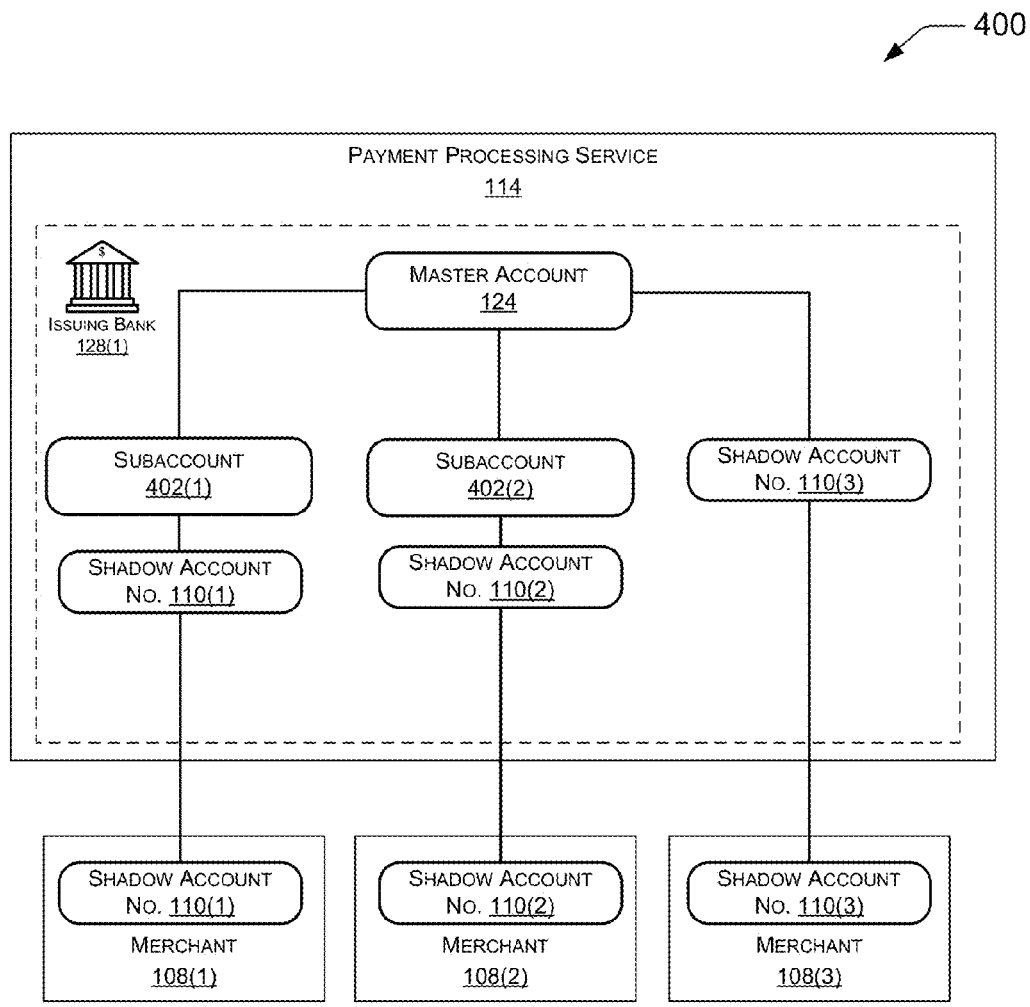
FIG. 4 is an illustrative architecture of a payment processing service ("PPS") storing information regarding a master account, subaccounts of the master account, and shadow accounts associated with these subaccounts.

FIG. 4 is an illustrative architecture 400 of multiple different shadow accounts depending from a single issuing bank 128. While this and further figures illustrate multiple shadow accounts, other implementations may comprise a single shadow account depending from at least one issuing bank. In this illustration, master account 124 and subaccounts 402(1)-(2) may be universally valid numbers, such as credit card, checking account numbers, or the like, suitable for use at any merchant that accepts those payment types.

FIG. 4 illustrates that payment processing service 114 may store or otherwise have access to a master account, such as master account 124. Master account 124 is issued by issuing bank 128(1) in this example. Those accounts that are tied to issuing bank 128(1) are present within the dotted line.

In this example, subaccounts 402(1) and 402(2) are subordinate to master account 124. A shadow account number 110(1) depends from subaccount 402(1), while a shadow account number 110(2) depends from sub-account 402(2). Merchant 108(1) has also been associated with shadow account number 110(1), while merchant 108(2) is shown as associated with shadow account number 110(2). Thus, payment processing service 114 may validate a transaction request associated with shadow account number 110(1) in instances where merchant 108(1) sends the request, while denying transaction requests associated with this shadow account number sent from a different merchant. Similarly, payment processing service 114 may validate a transaction request associated with shadow account number 110(2) in instances where merchant 108(2) sends the request, while denying transaction requests associated with this shadow account number sent from a merchant other than merchant 108(2).

Shadow account numbers may additionally or alternatively depend directly from master account 124. As shown here, shadow account number 110(3) is associated directly with master account 124 and has no intervening subaccount. Shadow account number 110(3) is associated with merchant 108(3).

This figure also illustrates that the payment information associated with master account 124 and subaccounts 402(1)-(2) is stored within PPS 114. Recall that master account 124 and subaccounts 402(1)-(2) may be universally valid numbers, such as credit card or checking account numbers, suitable for use at any merchant that accepts those payment types.

However, merchants 108(1)-(3) each have only stored shadow account numbers 110(1)-(3), respectively. Thus, a compromise of payment information stored by merchant 108(1) would only result in revealing shadow account number 110(1). Furthermore, since shadow account number 110(1) is only valid when used in conjunction with a transaction from merchant 108(1), the utility of the shadow account number to an attacker 130 is severely limited. To attacker 130, shadow account number 110(1) appears to be a "regular" master account number that is universally usable. However, once attacker 130 attempts to use at another merchant, fraud alerts are triggered, as described in detail below.

Among the benefits provided by the techniques is the ability for a user to easily use and administer a variety of accounts. Each of these accounts, represented by a corresponding shadow account, may have different terms of use. A user may thus select to use a particular financial instrument, such as a given subaccount, in a particular transaction.

Figure 5:
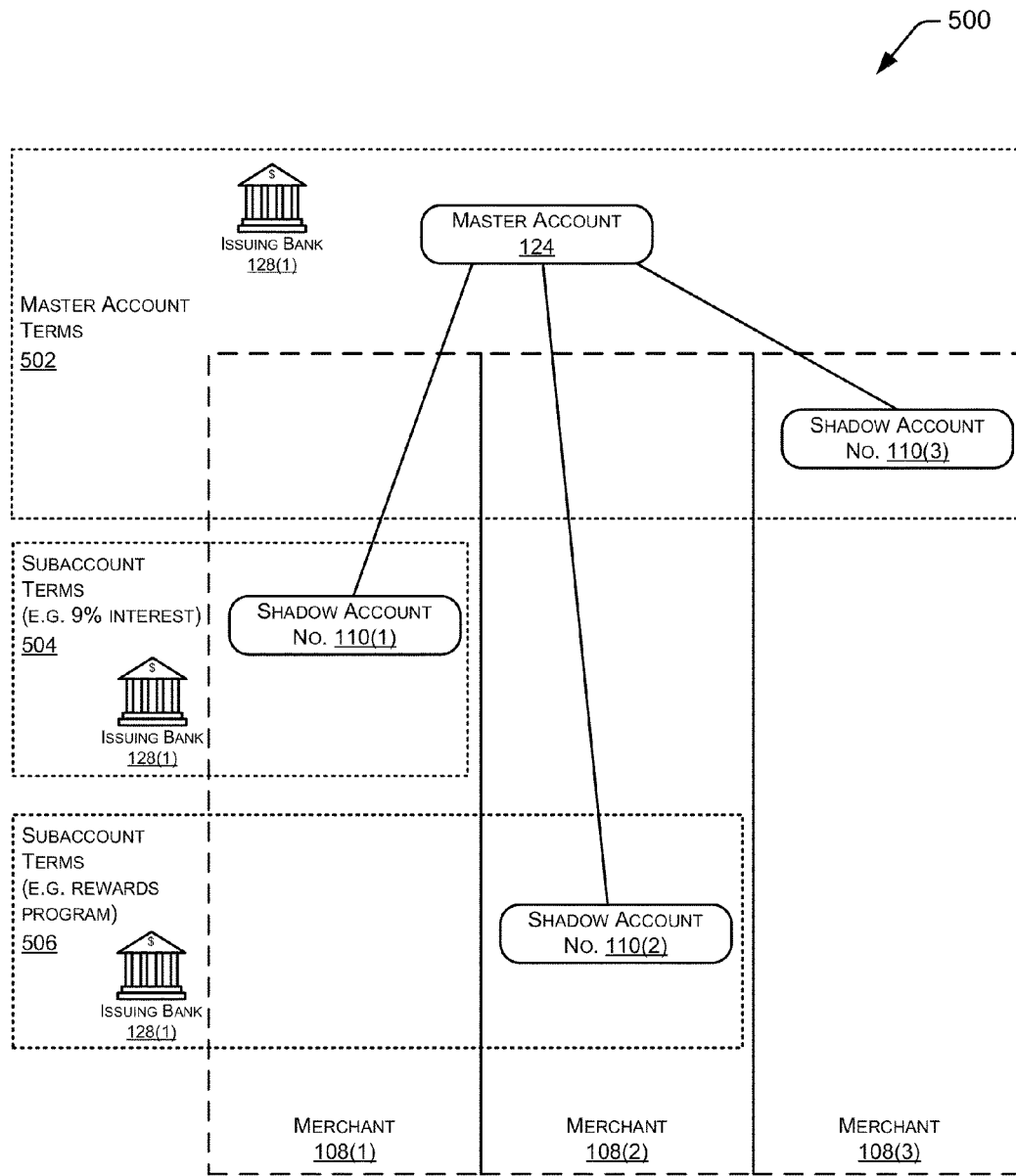
FIG. 5 is a diagram illustrating the different terms available to the master and shadow accounts of FIG. 4.

FIG. 5 is a diagram illustrating the different terms 500 available to the master and shadow accounts of FIG. 4. Issuing bank 128(1) may set forth the master account terms 502. These terms may include repayment terms such as interest rates, grace periods, balance minimums, balance maximums, balance transfer rates, and so forth, as well as customer incentives and the like. For example, master account terms 502 may provide for a twenty day grace period for payment on the master account 124 and any subaccounts. Should user 102 initiate a transaction using the master account 124 itself, or shadow account number 110(3) which is valid only at merchant 108(3), the transaction would be subject to these master account terms 502.

Shadow account number 110(1), which represents subaccount 402(1), is shown as being subject to subaccount terms 504. In this example, the issuing bank 128(1) remains the same as the master account 124. However, subaccount 402(1) has supplemental terms which affect transactions completed with shadow account number 110(1). For example, the subaccount terms 504 may indicate that subaccount 402(1) offers 9% interest on balances. However, as this is a subaccount of master account 124, subaccount 402(1) may remain subject to the twenty day grace period.

In other implementations, subaccount terms may override the master account terms 502. For example, subaccount terms 504 may alter the grace period of the master accounts terms 502 by increasing the grace period to thirty days or by reducing the grace period to five days.

Subaccount terms 506 apply to subaccount 402(2), which is associated with shadow account number 110(2). In this example, subaccount terms 506 may provide for an incentive program such as cash back or frequent flyer miles, and so forth.

Also, it is noted that in some implementations a shadow account number 110 may be valid across a plurality of merchants 108. For example, shadow account number 110(3) may be designed to be valid at both merchant 108(3) and merchant 108(2).

In some occasions, it may be advantageous to use several issuing banks. For example, one issuing bank may require the user personally guarantee debts accrued on the account, while the second issuing bank may not. In another example, one issuing bank may offer accounts with generous incentive programs, while the second issuing bank offers very low interest rates.

Figure 6:
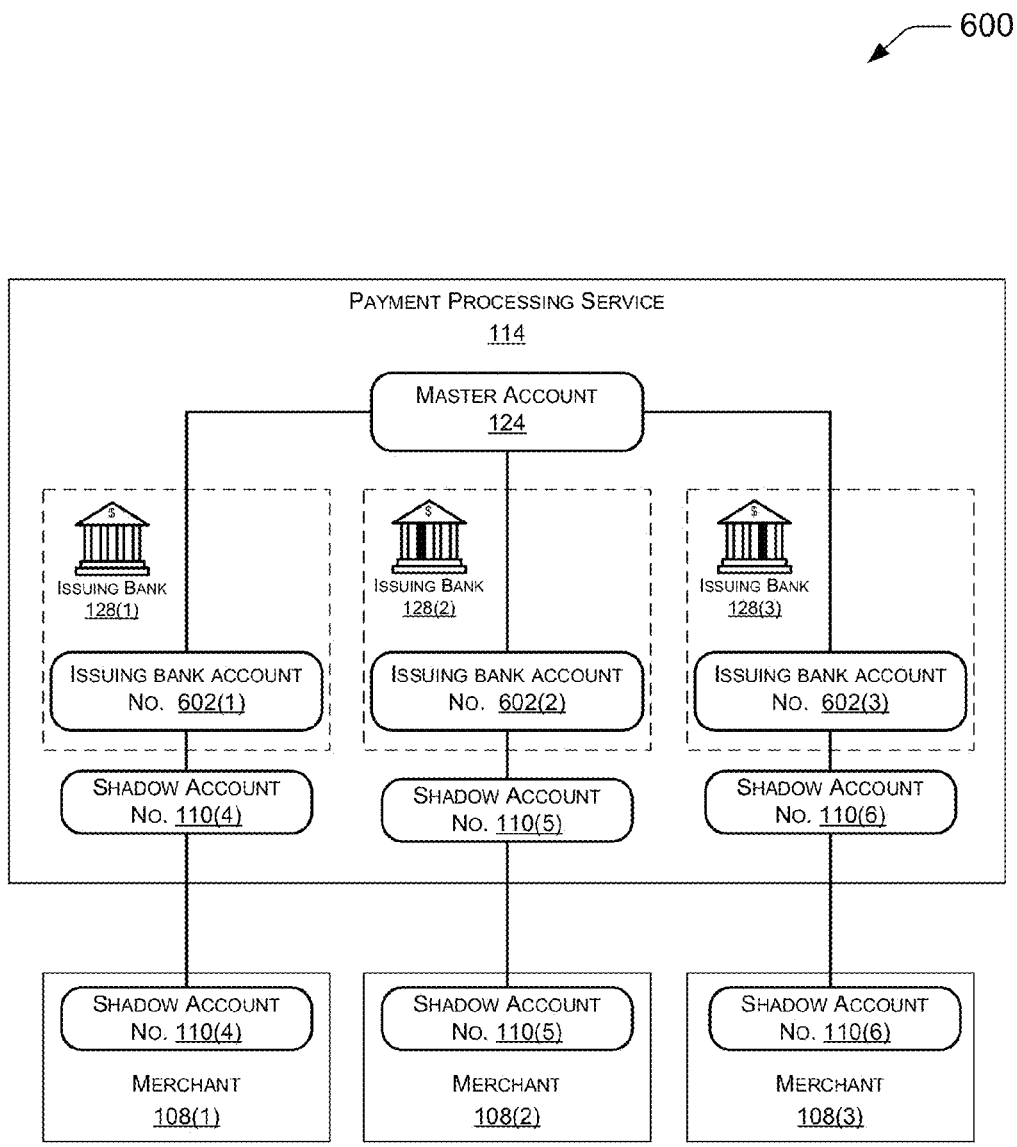
FIG. 6 is an illustrative architecture of a PPS having a master account with subordinate issuing bank accounts from different issuing banks, each with an associated shadow account number.

FIG. 6 is an illustrative architecture 600 of shadow accounts depending from a plurality of issuing banks 128. Shown in this illustration is payment processing service 114. Stored within payment processing service 114 may be master account 124. FIG. 6 further illustrates issuing banks 128(1)-(3) and their respective issuing bank accounts numbers 602(1)-(3), which are arranged hierarchically under master account 124.

Shadow account numbers 110(4)-(6) are associated with issuing bank accounts 602(1)-(3), respectively. Merchants 108(1)-(3) have also been associated with shadow account numbers 110(4)-(6), respectively.

As described above, the combination of shadow account number 110 and a specific attribute, such as merchant ID 126, is used to validate a transaction. For example, a transaction from merchant 108(2) using shadow account number 110(5) would be valid and affect issuing bank account 602(2).

Figure 7:
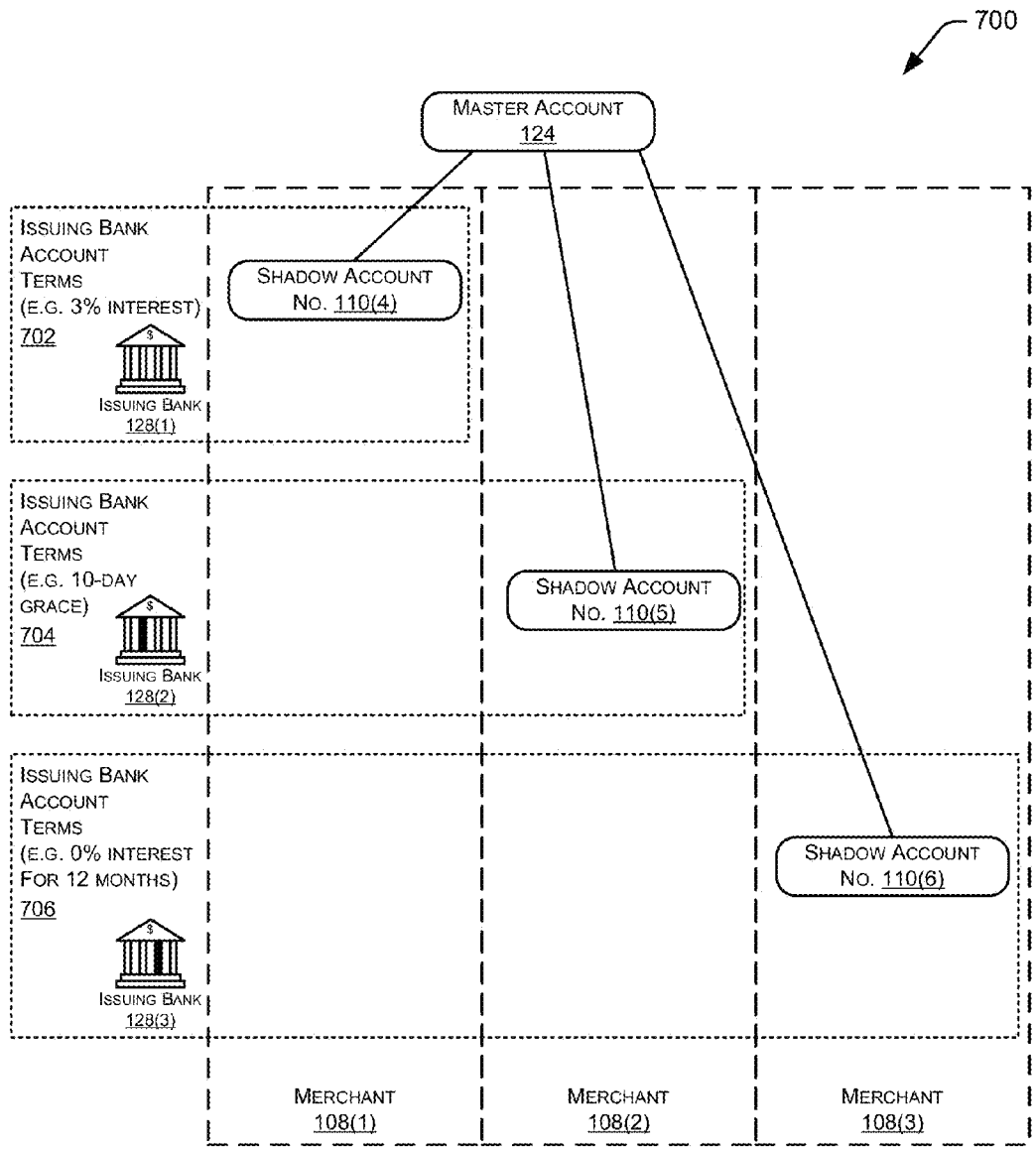
FIG. 7 is a diagram illustrating the different terms available to the master and shadow accounts of FIG. 6.

Similar to that described above with regards to FIG. 5, each of the shadow accounts may reflect underlying accounts having different terms. FIG. 7 is a diagram illustrating the different terms 700 available to the shadow accounts of FIG. 6. Each issuing bank 128 may set forth its own terms of use for the issuing bank account 602. As shown in this example, shadow account 110(4), associated with issuing bank account no. 602(1) and merchant 108(1), is subject to issuing bank account terms 702, such as a 3% interest rate. In comparison, shadow account 110(5), which is valid for merchant 108(2), is subject to issuing bank account terms 704 of a ten day grace period. Finally, shadow account 110(6), associated with issuing bank account no. 602(3) and merchant 108(3), is subject to issuing bank account terms 706, which provide for a 0% interest rate for twelve months.

Financial instruments and their terms are constantly undergoing flux. Credit card interest rates vary. Saving account rates wax and wane. Lines of credit may be extended or withdrawn. Given the dynamic nature of financial systems, it may be advantageous to offer users the flexibility to incorporate subaccounts and issuing bank accounts under the same master account.

Figure 8:
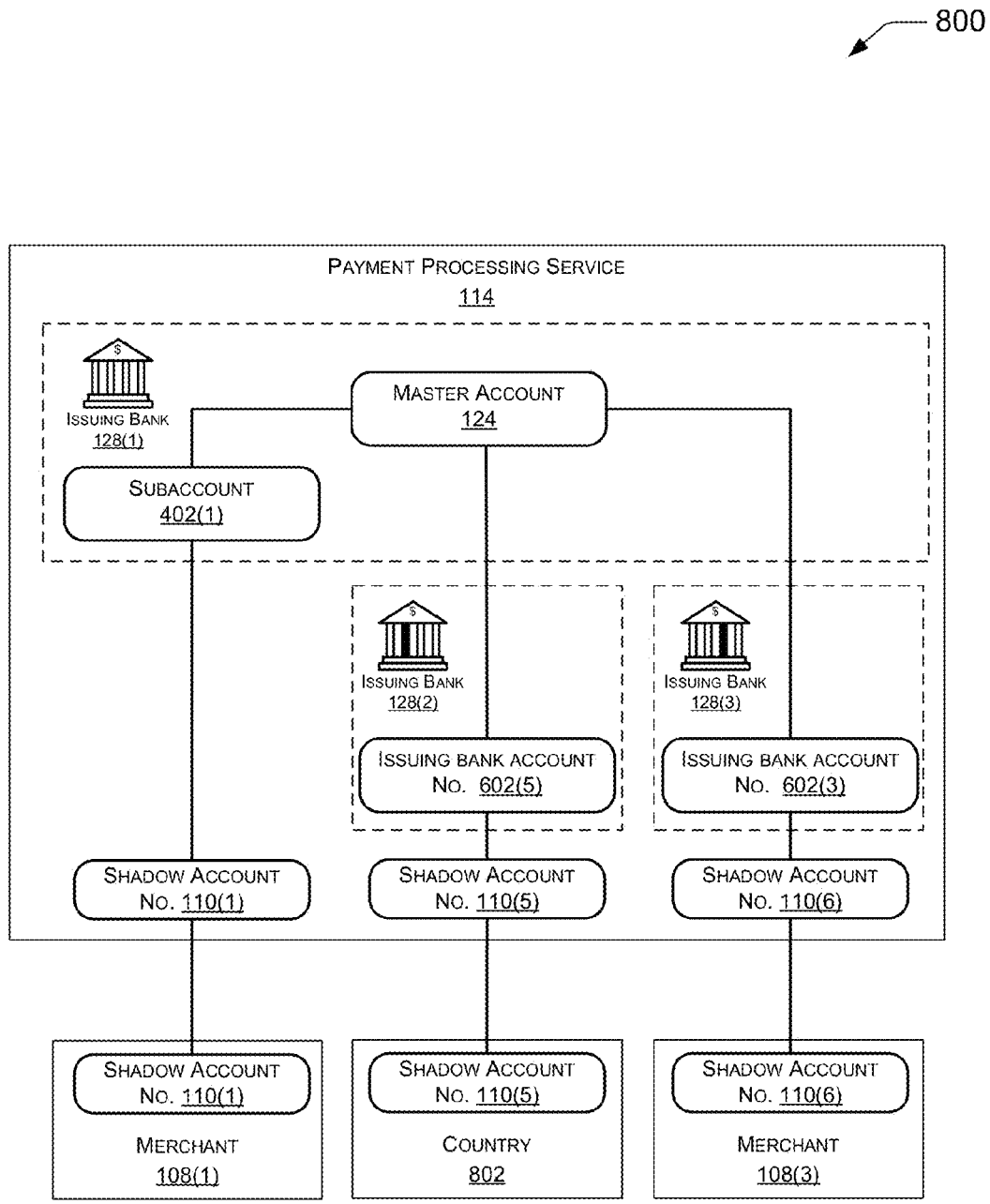
FIG. 8 is an illustrative architecture of a PPS having a master account with subaccounts and associated shadow account numbers, as well as subordinate issuing bank accounts from different issuing banks.

FIG. 8 is an illustrative architecture 800 of a master account with subaccounts and subordinate issuing bank accounts from different issuing banks, each with associated shadow account numbers.

FIG. 8 illustrates payment processing service 114. Payment processing service 114 may include a master account 124 from issuing bank 128(1). Subaccount 402(1) as described above may depend from master account 124. Issuing bank accounts 602(3) and 602(5) may also depend from master account 124. Issuing bank 128(3) provides issuing bank account 602(3), which is associated with shadow account 110(6). Shadow account 110(6) is associated with merchant 108(3).

As mentioned above, other specific attributes may be used in conjunction with shadow account numbers. As shown here, issuing bank account number 602(5) from issuing bank 128(2) is associated with shadow account number 110(5). However, shadow account 110(5) is associated with a country 802 rather than a specific merchant. For example, user 102 may be traveling to Italy. Issuing bank 128(2) may provide an issuing bank account number 602(5) which may be concealed by shadow account number 110(5), which is designated as only valid for transactions that originate in Italy.

The ability to easily provide subaccounts and subordinate issuing bank accounts from a master account conveys several benefits to merchants 108 as well. For example, a small merchant 108 may be unable to afford a private label credit card. However, using the techniques described herein, a merchant 108 may offer a program to provide subaccounts or issuing bank accounts which depend from a user's 102 master account 124. Furthermore, during times of economic crises issuing banks may trim small merchants from their portfolios to cut costs. By consolidating accounts under a master account, such cuts may become unnecessary.

Additionally, users 102 may find it easier to secure credit with the presence of the master account. For example, where the master account 124 is from an issuing bank 128(1), subaccount 402(1) may be simpler to open given the pre-existing relationship with the issuing bank 128.

Figure 9:
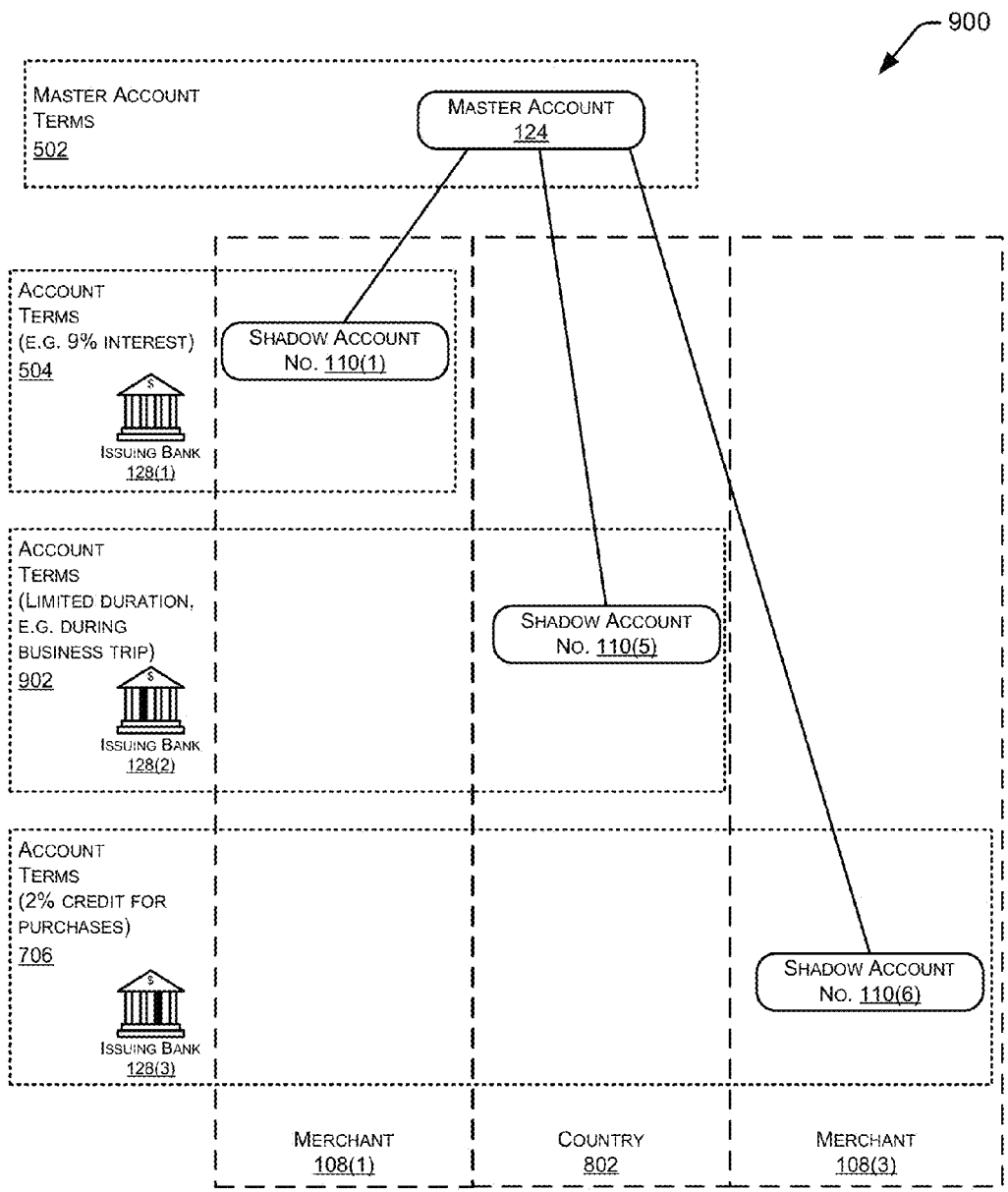
FIG. 9 is a diagram illustrating the different terms available to the accounts of FIG. 8.

FIG. 9 is a diagram illustrating the different terms 900 available to the shadow accounts of FIG. 8. As described earlier, master account 124 may be subject to master account terms 502, shadow account 110(1) may be subject to account terms 504, and shadow account 110(6) is subject to account terms 706. Shadow account number 110(5) is associated with issuing bank account number 602(5), which may include terms such as a limited duration and may require payment in Euros.

FIGS. 4-9 and the accompanying discussion described that issuing bank account and subaccount numbers may be stored within the PPS 114. However, this information may be additionally or alternatively stored at the issuing banks 128. Storage at the issuing bank limits the distribution of the sensitive information in the form of the "universal" account numbers. This, in turn, limits the potential for loss and liability stemming from the compromise of payment information.

Figure 10:
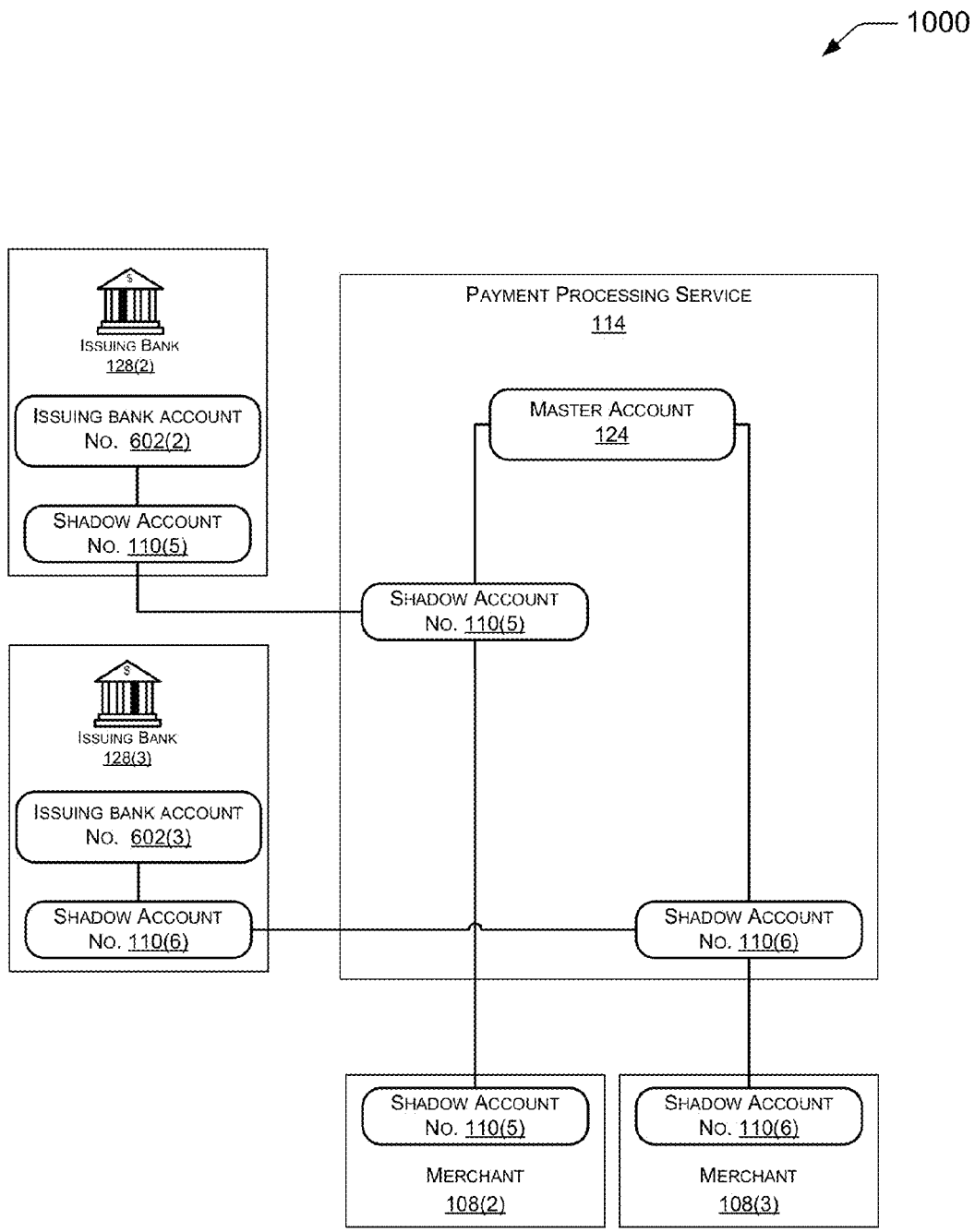
FIG. 10 is an illustrative architecture of a PPS where the issuing bank account numbers are stored with the issuing banks while shadow account numbers are stored at the PPS.

FIG. 10 is an illustrative architecture 1000 of a PPS 114 where the issuing bank account numbers are stored with the issuing banks 128 while shadow account numbers 110 are stored at the PPS 114. In this architecture, the PPS 114 stores no universally usable payment information. Only shadow account numbers 110 are stored. For example, shadow account number 110(5) associated with merchant 108(2) may be stored within PPS 114, but the actual issuing bank account number 602(2) is stored within the system controlled by issuing bank 128(2). Similarly, shadow account number 110(6) associated with merchant 108(3) may be stored within PPS 114. As above, the issuing bank account number 602(3) remains stored within issuing bank 128(3).

Each issuing bank 128 may thus become the sole entity responsible for highly safeguarding the universally-usable payment information. In the event that PPS 114 is compromised and shadow account numbers are obtained by an attacker 130, issuing banks 128(2) and 128(3) could simply re-issue new shadow account numbers, leaving the underlying issuing bank account numbers 602(2) and 602(3) unaffected.

In other implementations, payment information may be dispersed as desired between the PPS 114 and the issuing banks 128. For example, PPS 114 may store issuing bank account number 602(2) and not store issuing bank account numbers 602(3). In such a situation, dispersal of information may act to further provide some safeguards to non-shadow accounts. For example, suppose that account datastore 118 at PPS 114 comprises 50% shadow account numbers and 50% non-shadow account numbers such as master accounts 124, issuing bank account numbers 602 or subaccounts 402. Given that the shadow and non-shadow accounts are indistinguishable to the attacker 130, an attacker runs a significant risk of triggering a fraud alert when randomly selecting an account to exploit. This is because the randomly selected account may be a non-shadow account or a shadow account. If the randomly selected account is a non-shadow account, it would work at any merchant. However, if the randomly selected account is a shadow account, upon use with another merchant the shadow account would fail. Additionally, this failure may also trigger a fraud alert. As described above, this fraud alert could be used to backtrack and determine the compromised source, allowing even the non-shadow accounts to be monitored more closely or suspended entirely.

Illustrative User Interfaces

Figure 11:
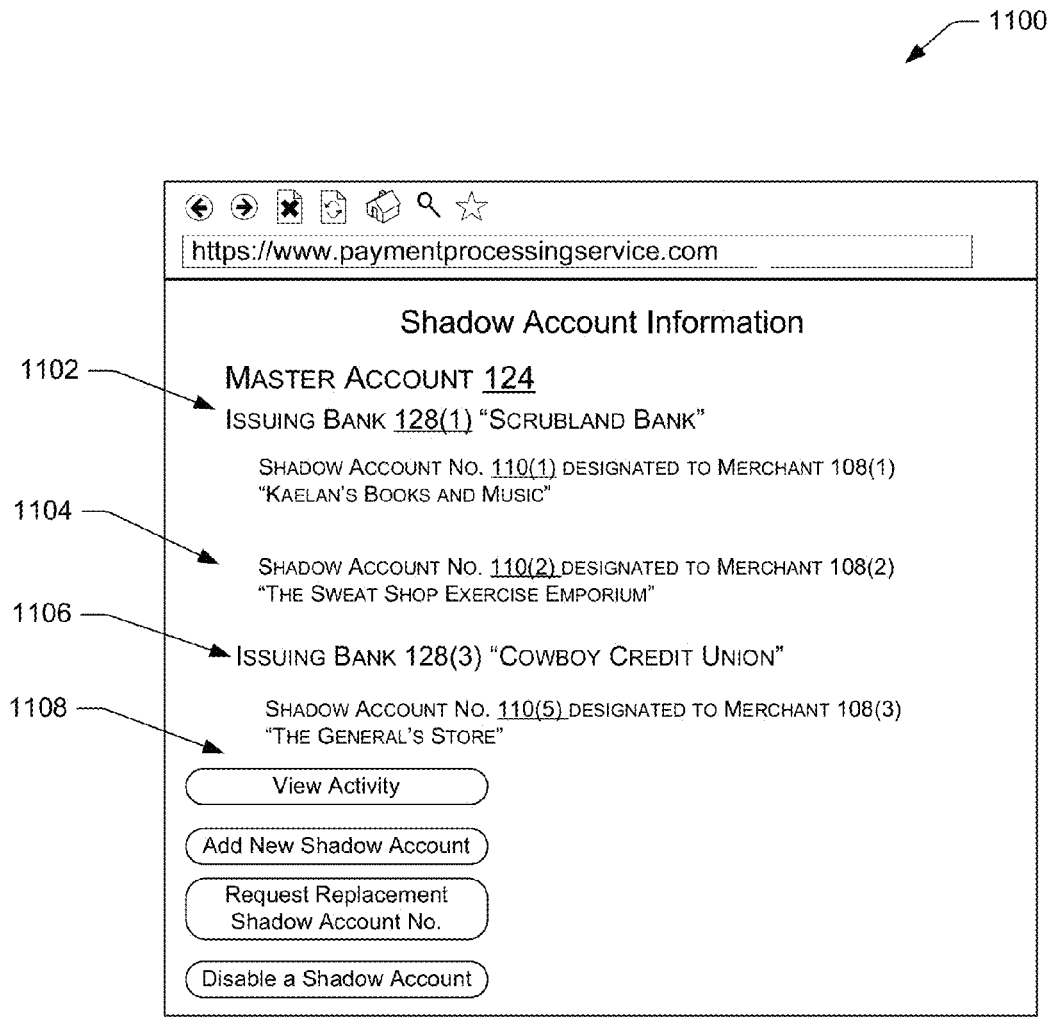
FIG. 11 is an illustrative rendering of a user interface depicting information about shadow accounts.

Users may interact with their shadow accounts using the user interfaces described next. FIG. 11 is an illustrative rendering of a user interface 1100 that includes information about shadow accounts. Specifically, user interface 1100 illustrates master account 124 and related subordinates. For instance, user interface 1100 illustrates subordinate issuing bank 128(1) at 1102. Shadow account number 110(1) is associated with issuing bank 128(1) via subaccount 402(1) and is designated for merchant 108(1). Underlying account numbers may, but need not, be presented to the user.

At 1104, the user interface illustrates a second shadow account 110(2), which is also associated with issuing bank 128(1) but is designated for merchant 108(2). Thus, as described earlier, transactions using this shadow account number 110(2) are only valid when made at merchant 108(2).

At 1106, the interface illustrates a second issuing bank 128(3) with an associated shadow account number 110(5) that is designated for use by merchant 108(3). As described above with regards to FIG. 8, second issuing bank 128(3) may have terms which differ from the terms of issuing bank 128(1) above.

At 1108, the user interface 1100 presents several controls that allow the user to maintain and manage their shadow accounts. For example, user 102 may view activity, add a new shadow account, request a replacement shadow account number, disable a shadow account, and so forth.

In some implementations, shadow accounts numbers may be obtained by a user directly from the issuing bank and may be associated with a merchant. The user may then enter this shadow account number at the merchant, as they would a master account number. In this implementation, the merchant need not be privy to the fact that the account number stored at the merchant is a shadow account number.

FIG. 12 is an illustrative rendering of a user interface 1200 depicting information about shadow account activity during a specific period. As shown at 1202, purchase details for each of the shadow accounts may be presented to the user, along with totals for the shadow account. At 1204, the user interface illustrates a control for user selection of a payment. This selection of payment may be used to distribute funds amongst the shadow accounts. For example, a user may select to partially pay one shadow account while completely paying another shadow account.

In addition to safeguarding sensitive information, another benefit conveyed by the techniques in this application is that the user 102 may take advantage of different terms and incentives provided by different financial institutions. The centralized administrative functions allow a user to easily track and manipulate a variety of accounts, each of which may be suited for particular financial tasks. Thus a user might easily move a balance from a credit card with a high rate of interest to a home equity line of credit.

Furthermore, the centralized administration reduces the effort in dealing with a compromised account. For example, should a shadow account be compromised, the shadow account may be easily disabled while leaving the underlying account untouched.

Illustrative Processes

Figure 13:
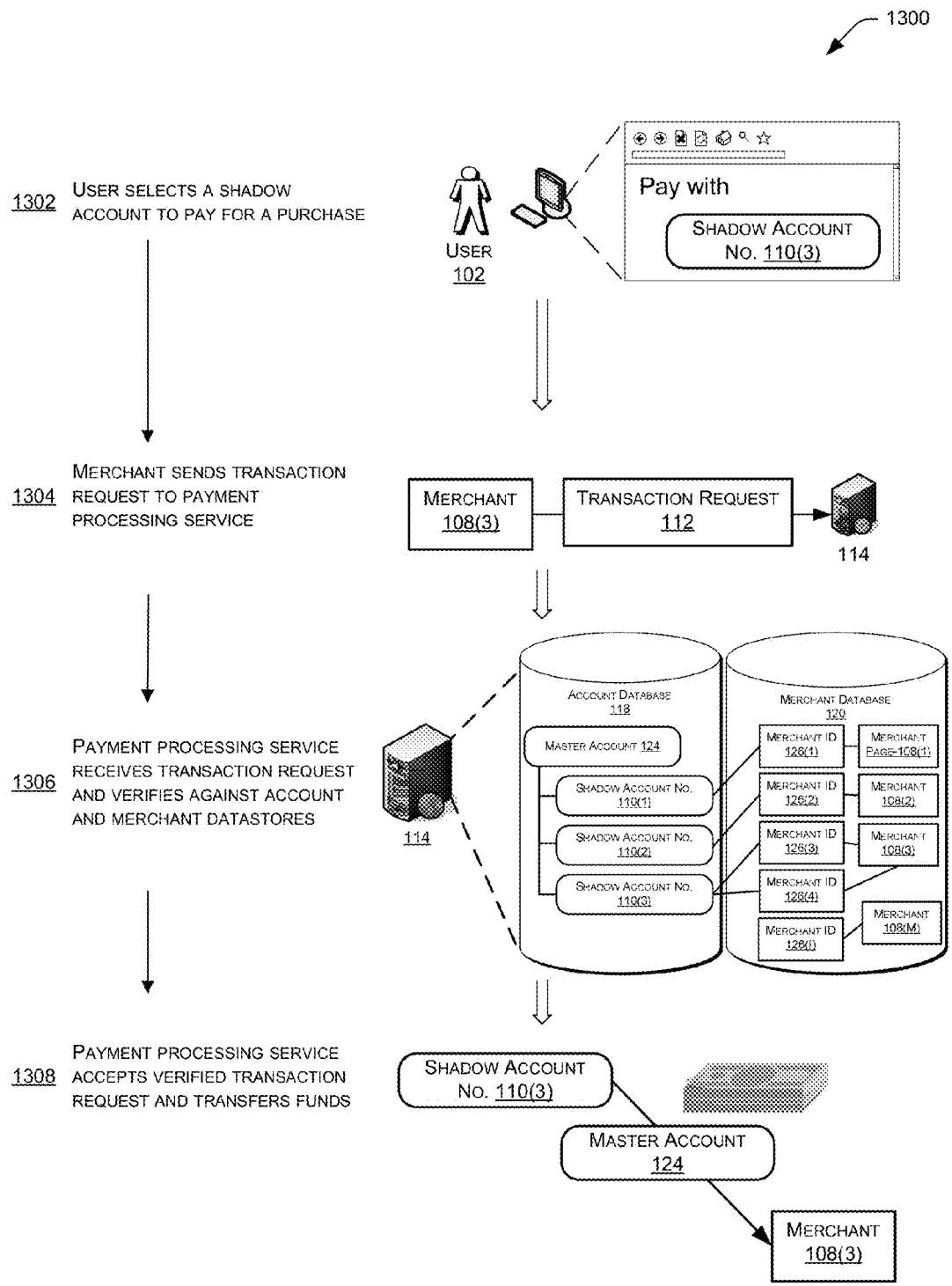
FIG. 13 is an illustrative process of a transaction that involves a shadow account number.

FIG. 13 is an illustrative process 1300 of a transaction involving a shadow account number. Operation 1302 shows a user selecting a shadow account 110(3) to pay for a purchase. Operation 1304 shows the merchant 108(3) sending, in response, a transaction request 112 to the payment processing service 114. Operation 1306 shows the payment processing service 114 receiving and verifying the transaction request 112. As describe below in more detail with regards to FIG. 18, a transaction request is verified when the shadow account and merchant identification correspond to that which is stored in the PPS 114.

Operation 1308 shows that the PPS 114 has accepted the verified transaction request 112 and thus transfers funds in accordance to the contents of the transaction request. For example, the PPS 114 may transfer funds from a master account 124 to a merchant 108(3).

Thus, in this example, the transaction is completed with an end result that is similar to instances when the user 102 and the merchant 108(3) uses the underlying master account 124 (e.g., a credit card, a checking account, etc.) to make the purchase. In this example, however, the merchant 108(3) communicated a shadow account number rather than the master account number, thus lessening the chance that an attacker could successfully useful important payment information. In some instances, the user 102 may not even be aware that he or she is paying with a shadow account number 110.

Figure 14:
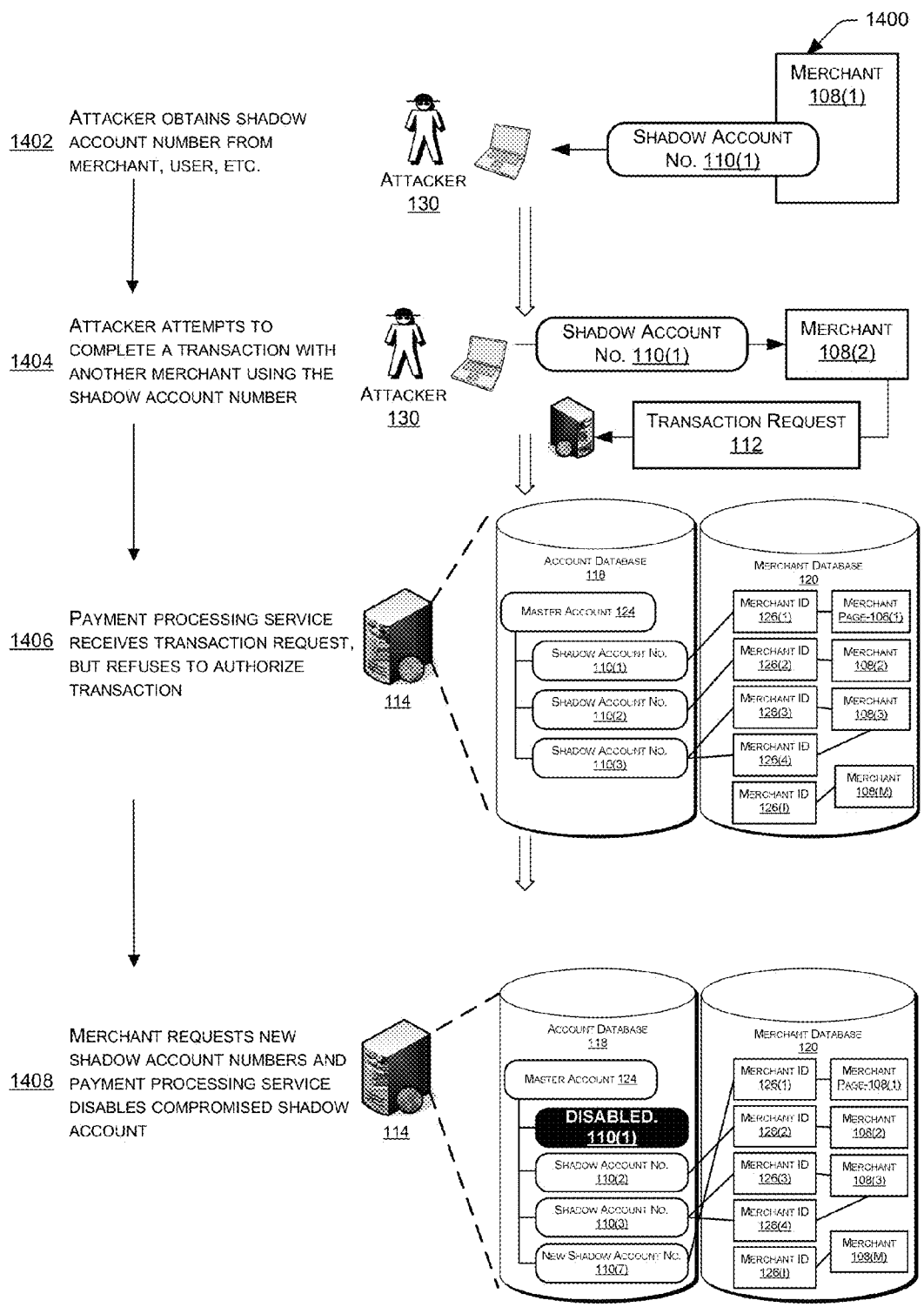
FIG. 14 is an illustrative process of an attempt made by an attacker to conduct a transaction with use of a shadow account number.

FIG. 14 is an illustrative process 1400 of a transaction made by an attacker 130 involving a shadow account number 110. Operation 1402 depicts an attacker 130 obtaining a shadow account number 110(1). This shadow account number 110 may be obtained by compromising the security of the merchant 108(1), a phishing attack on the user 102, and so forth. Operation 1404 shows attacker 130 attempting to complete a transaction using the shadow account number 110(1) with a merchant 108(2) for which the shadow account number 110(1) is not valid. As illustrated, the attacker 130 provides the shadow account number 110(1) to merchant 108(2), which in turn sends a transaction request 112 to PPS 114.

Operation 1406 shows PPS 114 receiving and attempting to validate the transaction request 112. Transaction request 112 fails validation because the combination of shadow account number 110(1) and merchant 108(2) is invalid. Thus, the PPS refuses to authorize the transaction. This failure may also trigger a fraud alert, which is discussed in more detail below with regards to FIG. 18.

Operation 1408 further shows the merchant 108(1) requesting new a shadow account number 110(7) from PPS 114 to replace the shadow account number 110(1) which was compromised. Also, PPS 114 may disable compromised shadow account number 110(1). In some implementations, the compromised merchant 108(1) or the PPS 114 may invalidate some or all shadow account numbers which were associated with merchant 108(1). This may be done to prevent further fraudulent transactions. However, simply invalidating shadow account numbers, while preventing further fraudulent transactions, may introduce an impediment to users. Thus, it may be useful to replace invalid shadow account numbers or master account numbers present at a merchant 108 with new shadow account numbers 110.

Figure 15:
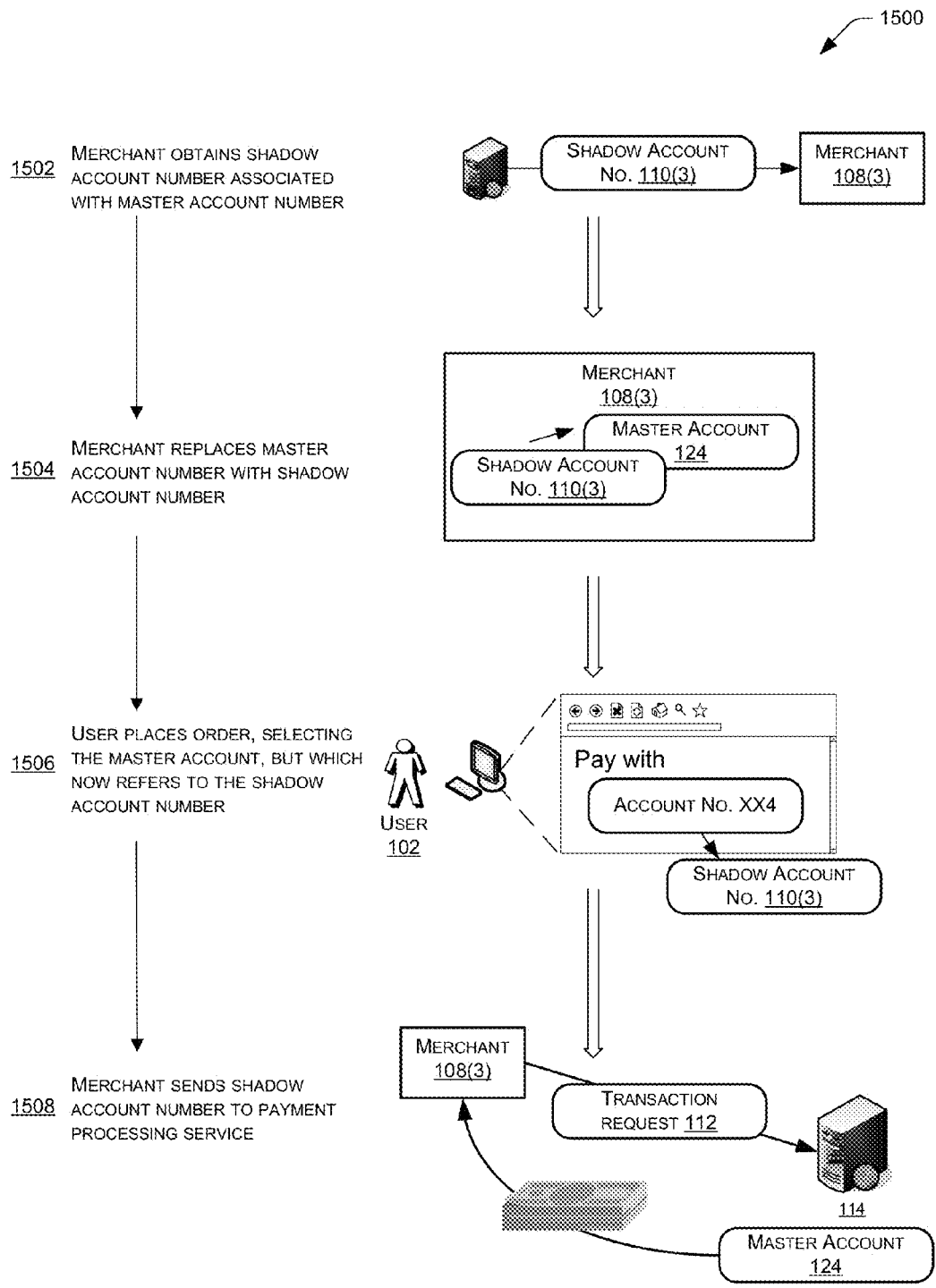
FIG. 15 is an illustrative process of a merchant replacing master account numbers with shadow account numbers.

FIG. 15 is an illustrative process 1500 of a merchant replacing master account numbers with shadow account numbers. Replacement of master account numbers, or existing shadow account numbers, may occur for several reasons. For instance, the replacement may be done a preventative measure to reduce the risk associated with a compromise. Also, the replacement may occur as a result of an actual or suspected compromise of the merchant's payment information. Furthermore, in some situations an issuing bank or government agency may require stringen safeguards for master account numbers, but less stringent safeguards for shadow account numbers. Thus, replacement of master account numbers with shadow account numbers may allow use of less stringent safeguards. While the following example depicts replacement of master account numbers, shadow account numbers may be replaced in similar fashion to that which is described below.

Operation 1502 depicts a merchant 108(3) obtaining a shadow account number 110(3) associated with a master account 124. Operation 1504 shows the merchant 108(3) replacing the master account 124 with the corresponding shadow account number. Operation 1506 shows a user 102 placing an order. During this order the user 102 may select the master account 124 to which they are accustomed, and perhaps which the user 102 originally entered. However, the number stored by the merchant 108(3) is no longer the master account 124. Instead, the user 102 has selected shadow account number 110(3). As described below with regards to FIG. 17, in some implementations a user identification of the original master account number may be retained. For example, the last four digits of the master account 124, a user defined name, and so forth. Thus, the user 102 may still make a purchase using the desired account.

At 1508, the merchant 108(3) sends the transaction request 112 which includes shadow account number 110(3) to the PPS 114, which in turn may validate and initiate a transfer of funds to merchant 108(3).

Illustrative Flow Diagrams

Figure 16:
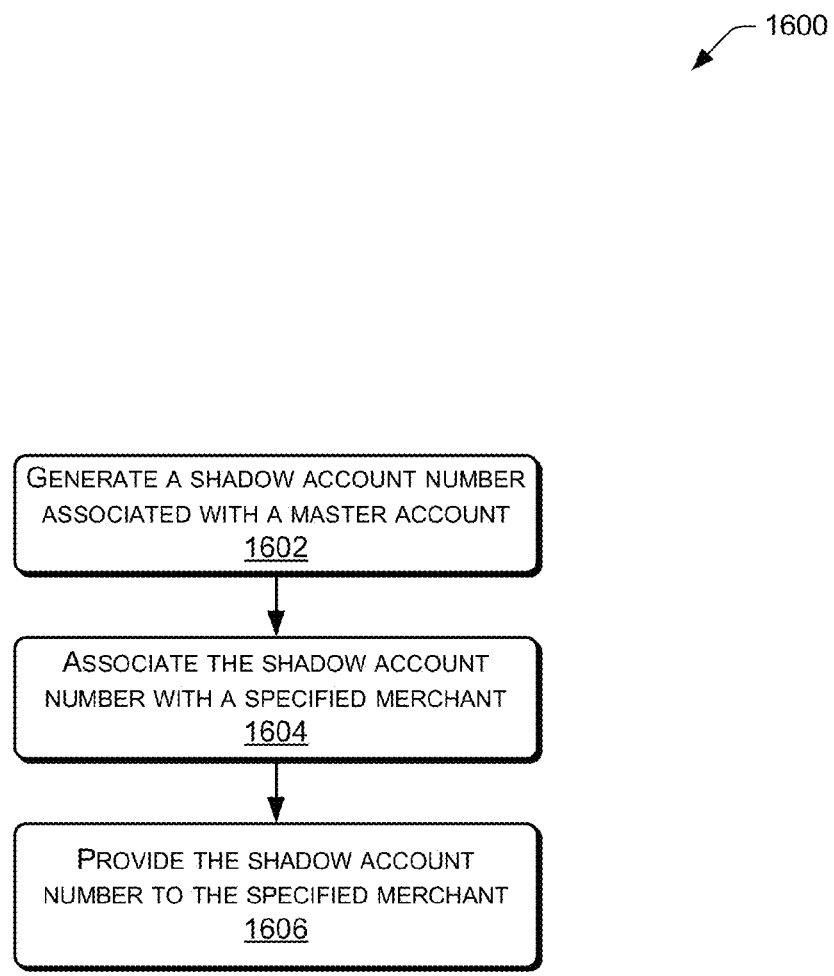
FIG. 16 is an illustrative flow diagram of a process for generating shadow accounts.

FIG. 16 is an illustrative flow diagram of a process 1600 for generating shadow accounts. The processes 1600, 1700, and 1800 are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, these processes will be described in the context of the architecture of FIGS. 1-12, but may be utilized in other architectures as well.

FIG. 16 is an illustrative flow diagram of a process 1600 for generating shadow accounts. Block 1602 generates a shadow account number 110 associated with a master account 124. In some implementations, the shadow account number 110 is generated such that it is not derived from the master account 124. Thus, the master account 124 is not used as a seed, input, or other factor in the generation of the shadow account number. For example, a shadow account number may be generated in part due to output from a random or pseudo-random number generator. Random number generators may include entropic sources such as thermal noise, shot noise, avalanche noise, radio noise, and so forth which are coupled to a randomness extractor. During generation, shadow account numbers may be constrained such that they pass a specified validation condition. For example, candidate shadow account numbers may be generated from a random number generator. Those candidate shadow account numbers which fail a Luhn check are removed, resulting in shadow account numbers suitable for use.

In some implementations, this shadow account number 110 may be generated in advance and left unassociated until called for. This association may comprise a pointer, datastore relationship, link, or other connection between the master account 124 and the shadow account number 110.

Block 1604 associates the shadow account number 110 with a specific merchant. In some implementations, the shadow account number 110 may be associated with a plurality of specified merchants 108(1)-(M). Furthermore, as described above with regards to FIG. 3, each merchant 108 may have a plurality of merchant IDs 126. Thus, a shadow account number may be associated with one or more of the merchant IDs 126 associated with a specific merchant 108.

Block 1606 provides the shadow account number 110 to the specific merchant 108. In some implementations, a user 102 may provide the shadow account number 110 to the merchant 108. In other implementations, the shadow account number 110 may be provided to the specific merchant 108 automatically from the PPS 114.

Merchants may choose to store the payment information. However, storage of this payment information increases the risk of loss. Thus, it may be advantageous for merchants 108 to replace their master account numbers, or other universally usable payment information, with shadow account numbers, as described next.

Figure 17:
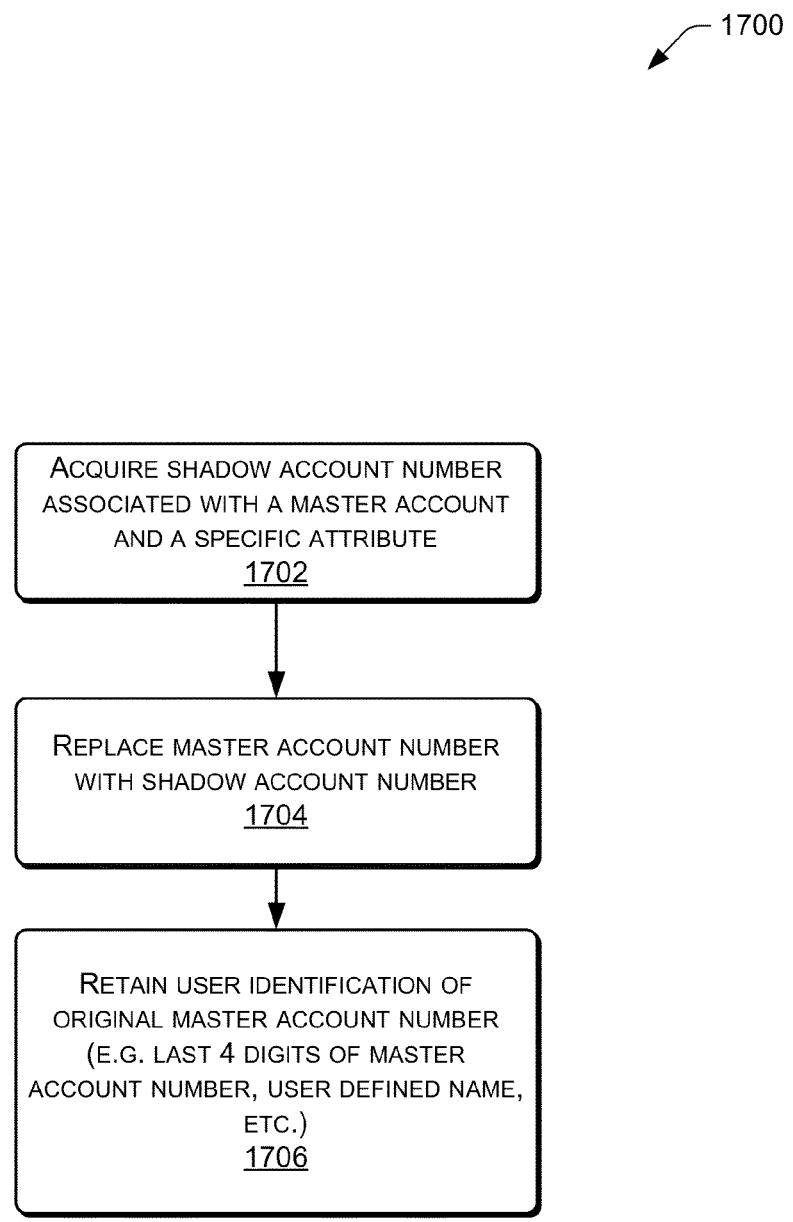
FIG. 17 is an illustrative flow diagram of a process for replacing master account numbers with shadow account numbers.

FIG. 17 is an illustrative flow diagram of a process 1700 for replacing a master account number with a shadow account number. Such a process may be implemented by a merchant 108, payment processor 114, user 102, and so forth.

Block 1702 acquires a shadow account number 110, which is associated with a master account 124 and a specific attribute, such as a merchant ID 126. Block 1704 replaces the master account 124 with the shadow account number 110.

Such replacement still allows the user 102 to submit transactions without hindrance, as the PPS 114 or issuing bank 128 is able to associate the shadow account with a particular account for billing and so forth. However, as described above, this replacement increases security to the user in the event of a compromise of the payment information by an attacker 130. As described above with regards to FIG. 2, an attacker 130 is unable to readily distinguish between "real" and shadow account numbers. Furthermore, use of the shadow account number 110 at an unassociated merchant 108 will at least fail, and at most may result in invalidation of all shadow account numbers 110 associated with the compromised merchant.

To facilitate ease of use, block 1706 may retain indicia used by a user 102 to identify the original master account 124. For example, the last four digits of a credit number, user-defined name, and so forth may be retained and presented to the user 102. Thus, the master account 124 may be replaced with a shadow account number 110 without user 102 even being aware of the replacement.

Once shadow account numbers 110 have been deployed across merchants 108, it becomes necessary to validate the resulting transaction requests. This validation is described next.

Figure 18:
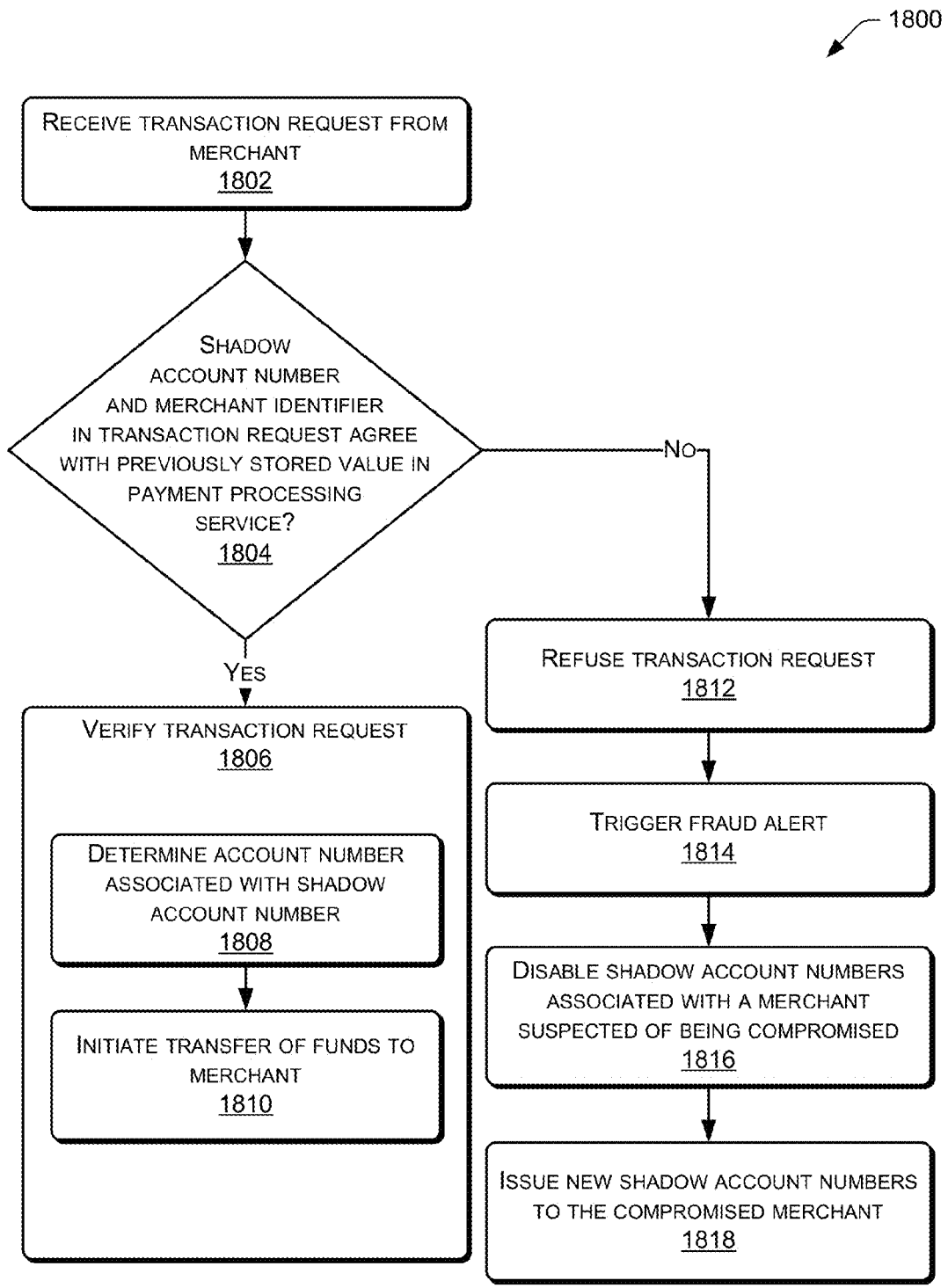
FIG. 18 is an illustrative flow diagram of a process for processing a transaction request.

FIG. 18 is an illustrative flow diagram of a process 1800 for processing a transaction request. Block 1802 may receive a transaction request 112 from merchant 108. As described above, this transaction request 112 includes a shadow account number 110 and may include a specific attribute, such as a merchant identifier 126. In some implementations, the PPS 114 may determine the specific attribute from characteristics of how the transaction request 112 is delivered. For example, the merchant identity may be determined when the transaction request 112 arrives with a pre-determined network address.

Block 1804 determines when the shadow account number 110 and specific attribute such as a merchant identifier 126 in the transaction request 112 agree with previously stored values in the PPS 114.

When the shadow account number 110 and the specific attribute agree with the previously stored values, block 1806 processes the verified transaction request. Block 1808 determines the account number associated with the shadow account number. Block 1810 initiates transfer of funds from the account number associated with the shadow account number to the merchant.

Returning to block 1804, when the shadow account number 110 and the specific attribute provided do not agree with the previously stored values, block 1812 refuses the transaction request. Block 1814 may trigger a fraud alert. A fraud alert may be a notification to automated systems, human operators, or both, indicating these entities that a potential compromise of an account has occurred.

Block 1816 disables shadow account numbers associated with the merchant suspected of being compromised. For example, if a transaction request 112 is received from merchant 108(2) containing shadow account number 110(1), one or more of the shadow account numbers associated with merchant 108(1) may be disabled. This may be done to limit damage in the event a compromise of payment information has taken place.

In some implementations, thresholds may be set that, when exceeded, result in the disabling of shadow account numbers associated with a merchant. For example, when PPS 114 receives a pre-determined number of transaction requests 112 within a specified time interval that fail validation and that originate from a common merchant, some or all of the shadow account numbers associated with that merchant may be disabled.

Block 1818 issues new shadow account numbers to the merchant suspected of being compromised. As a result, any shadow account numbers that may be used by attacker 130 would be rendered worthless. As described above, the attacker 130 would be unable to determine that the stolen payment information comprises shadow account numbers 110. As a result, an attempt to use the shadow account numbers at a different merchant 108 may rapidly disable the compromised shadow account number and other shadow account numbers suspected of compromise.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A computer-implemented method comprising:
generating, by at least one computing device, a first shadow account number associated with a financial account of a user;
associating, by the at least one computing device, the first shadow account number with a first merchant such that the first shadow account number is valid for use in a transaction generated by the first merchant but is not valid for use in a transaction generated by a second merchant;
providing, by the at least one computing device, the first shadow account number to the first merchant;
generating, by the at least one computing device, a second shadow account number that is also associated with the financial account of the user;
associating, by the at least one computing device, the second shadow account number with the second merchant such that the second shadow account number is valid for use in a transaction generated by the second merchant but is not valid for use in the transaction generated by the first merchant; and
providing, by the at least one computing device, the second shadow account number to the second merchant.

2. The method of claim 1, further comprising providing the first shadow account number to the user and providing the second shadow account number to the user.

3. The method of claim 1, further comprising:
receiving a request for the first or the second shadow account number from the user; and
providing the first or the second shadow account number to the user at least partly in response to the receiving of the request.

4. The method of claim 1, wherein the financial account comprises a bank account from an issuing bank.

5. The method of claim 1, wherein the first shadow account number associated with the financial account of the user is subject to a first set of terms of use and the second shadow account number associated with the financial account of the user is subject to a second, different set of terms of use.

6. The method of claim 5, wherein the terms of use comprise:
repayment terms;
customer incentives;
an interest rate;
a grace period; or
a balance transfer rate.

7. The method of claim 1, further comprising:
receiving a transaction request comprising the first shadow account number, a merchant identifier indicating a merchant that is originating the transaction request, and a request to transfer funds;
determining if the merchant that is originating the transaction request is the first merchant;
at least partly in response to determining that the merchant that is originating the transaction request is the first merchant, verifying the transaction request and transferring the funds as specified in the transaction request; and
at least partly in response to determining that the merchant that is originating the transaction request is not the first merchant, declining to verify the transaction request and refraining from transferring the funds.

8. A method comprising:
associating, by at least one computing device, a shadow account with an underlying account issued from a first entity, the shadow account being usable by a second, different entity in place of the underlying account, and the shadow account and the underlying account being associated with a user;
assigning one or more attributes to the shadow account specifying one or more restrictions on use of the shadow account in a financial transaction;
providing a shadow account number of the shadow account to the second entity and refraining from providing the shadow account number to the user;
receiving a request to validate a financial transaction made with the shadow account;
validating the financial transaction made with the shadow account at least partly in response to determining that the received request is associated with the assigned one or more attributes; and
declining to validate the financial transaction made with the shadow account at least partly in response to determining that the received request is not associated with the assigned one or more attributes.

9. The method of claim 8, wherein the first entity comprises a financial institution.

10. The method of claim 8, wherein the second entity comprises a merchant, a user, or a payment processing service.

11. The method of claim 8, wherein the assigned attribute comprises a merchant identifier that identifies at least one merchant that is eligible to make financial transactions with the shadow account.

12. The method of claim 8, wherein the assigned attribute comprises a geographic identifier that identifies at least one geographic region from which transactions are eligible to originate from with the shadow account.

13. The method of claim 8, wherein an underlying account number assigned to the underlying entity account is of a same composition as a shadow account number assigned to the shadow account.

14. The method of claim 8, wherein the shadow account and the underlying account are associated with a user, and further comprising presenting information about completed or attempted transactions involving the shadow account to the user.

15. The method of claim 8, wherein the underlying account number comprises one sub-account of multiple sub-accounts of a master account.

16. The method of claim 15, wherein at least two of the multiple sub-accounts comprise differing terms of use.

17. The method of claim 16, wherein the terms of use comprise an interest rate, a grace period, a balance transfer rate, or customer incentives.

18. The method of claim 15, further comprising distributing at least in part a payment applied to the master account to a sub-account charged after a valid financial transaction.

19. The method of claim 8, further comprising authorizing a transfer of funds from the underlying account at least partly in response to determining that the received request is associated with the assigned attribute.

20. The method of claim 8, further comprising triggering a fraud alert at least partly in response to determining that the received request is not associated with the assigned attribute.

21. The method of claim 8, further comprising invalidating each of one or more shadow accounts having a respective attribute that is equivalent to the assigned attribute at least partly in response to determining that the received request is not associated with the assigned attribute.

22. The method of claim 8, further comprising replacing each of one or more existing shadow accounts having a respective attribute that is equivalent to the assigned attribute with a new shadow account at least partly in response to determining that the received request is not associated with the assigned attribute.

23. The method of claim 22, wherein the replacing of the one or more existing shadow accounts with respective new shadow accounts comprises issuing one or more existing shadow account numbers one or more respective new shadow account numbers.

24. A server system, comprising:
one or more processors;
at least one memory coupled to the one or more processors;
the server system being associated with a merchant and further comprising:
a datastore stored in the memory and executable on the processors to maintain multiple shadow account numbers, each of the multiple shadow account numbers: being specific to the merchant; mapping within the datastore to an associated user; and mapping to an underlying account number of the associated user, at least two of the multiple shadow account numbers mapping to underlying account numbers of different associated users; and
a module stored in the memory and executable on the processors to initiate a transaction using one of the multiple, merchant-specific shadow account numbers mapped to the associated user.

25. The system of claim 24, wherein at least some of the shadow account numbers have a same composition as the corresponding underlying account numbers.

26. The system of claim 24, wherein a shadow account number and a corresponding underlying account number each refer to a same line of credit.

27. One or more computer-readable media storing computer-executable instructions that, when executed, cause one or more processors to perform acts comprising:
- maintaining, in a datastore associated with a specific merchant, one or more payment account numbers each associated with a respective user;
- receiving one or more shadow account numbers each corresponding to one of the one or more payment account numbers and each being valid for use in financial transactions initiated by the specific merchant but not valid for financial transactions initiated by merchants other than the specific merchant; and
- replacing, in the datastore, each of the one or more payment account numbers with a corresponding received shadow account number.

28. The computer-readable media of claim 27, further comprising initiating at the specific merchant a financial transaction with the shadow account number.

29. The computer-readable media of claim 27, wherein payment account numbers comprise a credit card number, a debit card number, or a gift card number.

30. The computer-readable media of claim 27, wherein the shadow account numbers are of a same composition as the corresponding payment account numbers.

* * * * *